(12) United States Patent
Hashikawa

(10) Patent No.: US 11,534,812 B2
(45) Date of Patent: Dec. 27, 2022

(54) DEVICE FOR APPLYING COILING-TENSION TO A SLIT BAND SHEET

(71) Applicant: JDC, inc., Nagasaki (JP)

(72) Inventor: Naoto Hashikawa, Nagasaki (JP)

(73) Assignee: JDC, Inc., Sasebo (JP)

( * ) Notice: Subject to any disclaimer, the term of this patent is extended or adjusted under 35 U.S.C. 154(b) by 242 days.

(21) Appl. No.: 17/088,474

(22) Filed: Nov. 3, 2020

(65) Prior Publication Data
US 2021/0060632 A1   Mar. 4, 2021

Related U.S. Application Data

(62) Division of application No. 15/561,954, filed as application No. PCT/JP2016/077310 on Sep. 15, 2016, now Pat. No. 10,875,070.

(51) Int. Cl.
*B21C 47/00* (2006.01)
*B21C 47/26* (2006.01)
(Continued)

(52) U.S. Cl.
CPC ............ *B21C 47/003* (2013.01); *B21C 47/00* (2013.01); *B21C 47/006* (2013.01); *B21C 47/26* (2013.01);
(Continued)

(58) Field of Classification Search
CPC ...... B65H 23/00; B65H 23/10; B65H 23/105; B65H 23/26; B65H 23/30; B65H 23/32;
(Continued)

(56) References Cited

U.S. PATENT DOCUMENTS

| 3,368,728 A | | 2/1968 | Gudmestad |
| 3,386,679 A | * | 6/1968 | Foulon ................... B65H 20/02 |
| | | | 226/177 |

(Continued)

FOREIGN PATENT DOCUMENTS

| FR | 2683213 A1 | * | 5/1993 | ............. B65G 15/14 |
| GB | 2072152 A | * | 9/1981 | ........... B21C 47/003 |

(Continued)

*Primary Examiner* — Michael R Mansen
*Assistant Examiner* — Raveen J Dias
(74) *Attorney, Agent, or Firm* — Heedong Chae; Lucem, PC

(57) ABSTRACT

A device for applying coiling-tension to a slit band sheet includes an upper structure that is disposed on the upper side of a band sheet which has been passed through a slitter line and slitted; and a lower structure that is disposed on the lower side of the band sheet and faces the upper structure vertically. In addition, an upper belt is stretched on an outer peripheral surface of the upper structure. A lower belt is stretched on an outer peripheral surface of the lower structure. The upper structure has a first reversing portion, an upper pressing portion, and a second reversing portion. The first reversing portion and the upper pressing portion are integrated with each other. A tension adjusting mechanism is installed on side surfaces of the first reversing portion and the upper pressing portion and a side surface of the second reversing portion.

5 Claims, 11 Drawing Sheets

(51) Int. Cl.

| | | |
|---|---|---|
| *B65H 23/10* | (2006.01) | |
| *B65H 20/06* | (2006.01) | |
| *B65H 20/08* | (2006.01) | |
| *B65H 23/30* | (2006.01) | |
| *B65G 37/00* | (2006.01) | |
| *B65G 15/14* | (2006.01) | |
| *B65G 15/12* | (2006.01) | |
| *B21C 47/34* | (2006.01) | |

(52) U.S. Cl.
CPC ............. *B65H 20/06* (2013.01); *B65H 20/08* (2013.01); *B65H 23/10* (2013.01); *B65H 23/105* (2013.01); *B21C 47/3458* (2013.01); *B65G 15/12* (2013.01); *B65G 15/14* (2013.01); *B65G 37/005* (2013.01); *B65H 23/30* (2013.01); *B65H 2301/5305* (2013.01)

(58) Field of Classification Search
CPC .. B65H 23/0324; B65H 23/18; B65H 23/188; B65H 23/1882; B65H 23/1884; B65H 20/06; B65H 20/08; B65H 27/00; B65H 29/00; B65H 2301/5305; B65H 2301/5144; B65H 2301/4148; B65H 2301/41482; B65H 2403/72; B65H 2404/20; B65H 2404/1532; B21C 47/00; B21C 47/003; B21C 47/006; B21C 47/26; B21C 47/1345; B21C 47/3458; B21D 43/00; B21D 43/12; B21D 43/145; B65G 15/10; B65G 15/12; B65G 15/14; B65G 37/00; B65G 37/005; B65G 2812/018
USPC ............ 242/423, 423.1, 423.2, 423.3, 419.5, 242/419.8; 226/195
See application file for complete search history.

(56) References Cited

U.S. PATENT DOCUMENTS

| | | | | |
|---|---|---|---|---|
| 3,481,523 | A * | 12/1969 | Baringer | B21D 43/12 |
| | | | | 226/176 |
| 3,735,937 | A | 5/1973 | Plantard | |
| 3,779,686 | A * | 12/1973 | Kerttula | B30B 5/06 |
| | | | | 425/371 |
| 4,135,620 | A * | 1/1979 | Harcuba | B65G 15/16 |
| | | | | 271/274 |
| 4,368,836 | A * | 1/1983 | Meeker | B65H 5/02 |
| | | | | 425/140 |
| 4,527,723 | A | 7/1985 | Umlauf | |
| 4,792,075 | A * | 12/1988 | Umlauf | B21C 47/3458 |
| | | | | 242/615.2 |
| 5,265,817 | A * | 11/1993 | Gaudin | B21C 47/006 |
| | | | | 242/419.9 |
| 5,454,502 | A * | 10/1995 | Hashikawa | B21C 47/006 |
| | | | | 242/419.5 |
| 5,919,333 | A * | 7/1999 | Maltby | B65H 23/105 |
| | | | | 242/419.9 |
| 6,978,961 | B2 * | 12/2005 | Hashikawa | B21C 47/3458 |
| | | | | 242/420.2 |
| 7,550,050 | B2 * | 6/2009 | Lewin | C21D 9/5737 |
| | | | | 148/595 |
| 8,663,528 | B2 * | 3/2014 | Jenkins | B65H 51/14 |
| | | | | 100/153 |
| 9,399,895 | B2 * | 7/2016 | Goddard | E21B 19/22 |
| 10,618,092 | B2 * | 4/2020 | Hashikawa | B21C 47/3458 |
| 2004/0004148 | A1 * | 1/2004 | Hashikawa | B21C 47/003 |
| | | | | 242/530.1 |
| 2005/0269187 | A1 * | 12/2005 | Jenkins | B65G 15/14 |
| | | | | 198/626.1 |
| 2006/0107622 | A1 * | 5/2006 | James | B29C 66/836 |
| | | | | 53/374.5 |
| 2010/0084502 | A1 * | 4/2010 | Hashikawa | B21C 47/003 |
| | | | | 242/419.8 |
| 2011/0030218 | A1 * | 2/2011 | Schmid | B21C 47/3458 |
| | | | | 72/203 |
| 2011/0120836 | A1 * | 5/2011 | Jenkins | B65G 15/14 |
| | | | | 198/604 |
| 2012/0085853 | A1 * | 4/2012 | Hashikawa | B21C 47/3458 |
| | | | | 242/419.4 |
| 2014/0260481 | A1 * | 9/2014 | Umlauf | B21B 39/08 |
| | | | | 72/164 |
| 2018/0099321 | A1 * | 4/2018 | Hashikawa | B21C 47/00 |
| 2019/0193133 | A1 * | 6/2019 | Hashikawa | B65H 20/06 |
| 2022/0001429 | A1 * | 1/2022 | Doi | B21C 47/3458 |

FOREIGN PATENT DOCUMENTS

| | | | | |
|---|---|---|---|---|
| GB | 2167032 A | * | 5/1986 | ........ B65G 15/14 |
| JP | 56-082755 A | | 7/1981 | |
| JP | 63-11112 U | | 1/1988 | |
| JP | 2003-214509 A | | 7/2003 | |
| JP | 2004-035174 A | | 2/2004 | |
| JP | 2010-144914 A | | 7/2010 | |
| JP | 2012-081477 A | | 4/2012 | |
| KR | 101897786 B1 | * | 9/2018 | ....... B65G 2812/018 |

* cited by examiner (a)

-- PRIOR ART --

(b)

-- PRIOR ART --

DEVICE FOR APPLYING COILING-TENSION TO A SLIT BAND SHEET

CROSS-REFERENCE TO RELATED APPLICATIONS

This application is a divisional of and claims priority to U.S. non-provisional patent application Ser. No. 15/561,954, filed on Sep. 26, 2017, which claims priority to PCT International Application No. PCT/JP2016/077310, filed on Sep. 15, 2016, the disclosures of which are incorporated herein by reference in their entirety.

TECHNICAL FIELD

The present invention relates to a device for applying coiling-tension to a slit band sheet and, more particularly, to a device for applying coiling-tension to a slit band sheet which is excellent in durability and improved in convenience in a slitter line of a metal band sheet.

BACKGROUND ART

In a so-called metal coil material processing line including a slitter line for a coiled long metal material, as a tension device before winding after slitting, for example, a roll bridle, a belt-type tension device, or the like is disposed.

This tension device imparts a coiling tension before a winder to slit band sheets so that the band sheets are tightly and securely wound around a winding coil.

In addition to the tension device, there is a coiling tension applying device of a multi-belt type tension system (refer to Patent Documents 1, 2, 3, and 4) in which a metal band sheet is clamped from above and below the metal band sheet by a plurality of divided endless belts to impart a coiling tension by a frictional force of the backside of the belt.

In the device of this multi-belt type tension system, since the inside and outside of the belt have different coefficients of friction, uniform tension can be imparted to each band sheet. In addition, since the belt surface and the band sheet are rotated without sliding, scratches are not easily generated on the surface of the band sheet.

For example, Patent Document 1 discloses a coiling tension applying device 100 shown in FIG. 11A. In the device 100, a belt 102 is stretched by a pair of pulleys 101, and the belt 102 is pressed by a pushing plate 104 interlocked with a cylinder 103. Further, the plurality of pulleys 101 is provided side by side, and a plurality of belts 102 is stretched.

In the device 100, the pulley 101, the belt 102, and the pushing plate 104 are integrated and arranged to face each other vertically. Between the belts 102 facing each other, the slit band sheet 106 is conveyed to a winder which is not shown, and the belt 102 vertically compresses the band sheet 106 via the upper and lower pushing plates 104.

In addition, in the belt 102, the outer side of the belt is made of a material having a large coefficient of friction and the inner side of the belt is made of a material having a small coefficient of friction. When the band sheet 106 is brought into contact with the outer surface of the belt 102, the coefficient of friction on the outer side of the belt is large, so that when winding of the band sheet is started by the winder, the belt 102 moves with the band sheet 106 without slipping.

The pulley 101 is axially supported to be freely rotatable and the belt 102 is circulated. Between the inner surface of the belt 102 and the pushing plate 104, a coefficient of friction of the inner surface of the belt is small, so that slippage occurs and a coiling tension in a direction opposite of the conveying direction is applied to the band sheet 106 by the frictional force generated at the same time. Similarly, a device described in each of Patent Documents 2 and 3 has a structure using a plurality of pulleys.

Patent Document 4 discloses a tension applying device 200 shown in FIG. 11B. The device 200 has a pressure applying body 202 that allows a belt 201 to be stretched around an outer peripheral surface thereof. The pressure applying body 202 includes two belt reversing portions 203 each having a cross section which is formed in an arc shape and a pressing portion 204 which presses the inner surface of the belt 201.

Protrusions are provided at regular intervals on the outer peripheral surface of the pressure applying body 202, and a plurality of belts 201 is stretched side by side. In the device 200, the pressure applying bodies 202 are arranged to face each other vertically. When a band sheet 205 which has been slit is conveyed to a winder between the facing belts 201, the belt 201 vertically compresses the band sheet 205 via the upper and lower pressing portions 204.

In addition, in the belt 201, the outer side of the belt is made of a material having a large coefficient of friction and the inner side of the belt is made of a material having a small coefficient of friction, in the same manner as in the device 100 of Patent Document 1. The belt 201 in contact with the band sheet 205 is circulated, and a coiling tension is generated on the belt 201 in the same manner.

PRIOR ART DOCUMENTS

Patent Literature

Patent Document 1: Japanese Patent Publication No. JP-A-56-82755

Patent Document 2: U.S. Pat. No. 3,735,937

Patent Document 3: Japanese Utility Model Publication No. JP-U-63-11112

Patent Document 4: Japanese Patent Publication No. 2004-35174

DETAILED DESCRIPTION OF THE INVENTION

Technical Problem

Here, in the devices of Patent Documents 1 to 3, a plurality of pulleys are used for stretching the belt, but a region where the belt is not guided exists between a plurality of pulleys over a wide range. In this region, since the belt is circulated while shaking to the right and left, a meandering phenomenon occurs at the time of winding of a narrow slit band sheet, causing a defect that the edges of the wound coil become uneven.

Further, in the tension devices that generate a coiling tension by pressing the inner surface of the belt, including the devices of Patent Documents 1 to 4, generation of frictional heat becomes a problem. That is, since the pushing plate or the pressing portion moves by pressing the inner surface of the belt, the frictional heat is generated and most of the frictional heat is absorbed into the belt so that the belt becomes hot.

In the tension devices using the pulleys of Patent Documents 1 to 3, the heat of the belt that has become hot moves to a metal pulley, and the temperature rises to nearly 100° C. As a result, in a laminated portion and a bonded portion of the belt formed by laminating and bonding dissimilar materials, an adhesive is deteriorated by heat, which leads to damage to the belt and hinders the operation of a slitter line over an extended time.

In the tension device using the pulleys, it is structurally difficult to cool more than 200 pulleys through cooling water or the like, and there is no cooling structure for the pulleys.

In addition, since there are a large number of components of the pulley and there are ball bearings for axially mounting the pulleys, the maintenance work of the pulleys and peripheral devices is complicated.

Further, in the tension device of Patent Document 4, circulating cooling water is made to flow inside the pressure applying body to cool the belt. However, the cooling water tends to flow through the center portion of the cross section of the belt reversing portion, or the pressing portion, and an amount of water flowing in the vicinity of the outer peripheral surface in contact with the belt is small, resulting in insufficient cooling efficiency.

In addition, since the belt reversing portion is not structured to rotate with respect to the belt that is circulated together with the above-mentioned pulley, the cooling efficiency is also deteriorated in this respect. As a result, even in the tension device of Patent Document 3, the frictional heat of the belt cannot be sufficiently removed so that the service life of the belt is shortened.

In addition, an air cooling effect of air communicating with gaps of a plurality of belt reversing guide members constituting the belt reversing portion or an air cooling effect by ventilating air inside the belt reversing guide member having a cylindrical shape is mentioned, but the cooling effect is insufficient because it is limited to the use of air. Further, it is structurally difficult to allow the cooling water to pass through the plurality of belt reversing guide members.

In addition, in the tension device of Patent Document 4, the belt reversing portion and the pressing portion are integrated, so that it is difficult to adjust the degree of tension of the belt. As the belt is used in the slitter line, the heating and cooling of the belt are repeated by the frictional heat.

At this time, the length of the belt becomes longer due to thermal expansion together with the temperature rise of the belt, and a gap is created between the belt and the pressure applying body. Alternatively, the belt may contract due to the repetition of heating and cooling thereof to tighten the pressure applying body, thereby causing defective rotation of the belt. As a result, a fatal problem of slippage marks being formed on the surface of the band sheet which has been slit also occurs.

In recent years, there has been a demand for improvement in productivity by winding a metal band sheet at a higher speed. When the metal band sheet is wound at a high speed in the winder, the belt of the tension device is also rotated at a high speed. Here, since there is no mechanism for adjusting the degree of tension of the belt, an inertial force in a direction of flow of the metal band sheet acts on the belt, so that the adhesion between the belt and the belt reversing portion may be reduced at the belt reversing portion on an advancing side. The reduction in the adhesion leads to deterioration of the belt due to a decrease in the belt cooling ability. The reduction in the adhesion also leads to a decrease in the straightness of the belt circulation movement (occurrence of shaking to the right and left) so that contact between the adjacent metal band sheets occurs, and thereby the edges of the metal band sheets may be damaged and the quality of the metal coil after winding may be deteriorated.

In addition, in the maintenance work, when replacing the belt, it is necessary to remove all of the plurality of belts from the pressure applying body, so that the replacement work of the belt is very troublesome.

Furthermore, Patent Document 3 discloses a mechanism for adjusting a pulling state of the belt by the ascending and descending operation of a bearing on which a pulley is mounted. However, there is a fear that the mechanism moves in the vertical direction and interferes with a stand or the like supporting a rotary shaft. As a result, a moving distance of the bearing is limited, and the adjustment of the pulling state of the belt becomes insufficient.

In addition, the adjustment mechanism disclosed in Patent Document 3 has a bearing that moves in the vertical direction so that, when the degree of tension of the belt is changed, the change in the degree of tension of the belt has a large influence on slippage between the pressing portion and the belt inner surface which likewise works in the vertical positional relationship, and the adjustment of the coiling tension on the metal band sheet is troublesome. Further, since the adjustment mechanism has a structure having a pulley, the above-described problem also occurs.

Therefore, the present invention has been made in view of the above-mentioned problems, and an aspect of the present invention is to provide a device for applying coiling-tension to a slit band sheet which is excellent in durability and improved in convenience in a slitter line of a metal band sheet.

Technical Solution

In accordance with an aspect of the present invention, there is a device for applying coiling-tension to a slit band sheet including: a first stretched portion configured to include a first belt reversing portion having an arc-shaped outer peripheral surface, and a second belt reversing portion disposed with a predetermined gap between the first belt reversing portion and the second belt reversing portion and having an arc-shaped outer peripheral surface formed on an opposite side of a side of the first belt reversing portion; one or more first belts, each of the one or more first belts configured to be made of materials having different coefficients of friction, to have a side with a smaller coefficient of friction that is brought into contact with the arc-shaped outer peripheral surfaces of the first belt reversing portion and the second belt reversing portion, and to be stretched in a ring shape to be freely circulated around the first stretched portion; a first pressing portion configured to be provided between the first belt reversing portion and the second belt reversing portion and adjacent to the first belt reversing portion, and to be brought into contact with the side with the smaller coefficient of friction of the one or more first belts by a predetermined length; a first tension adjusting portion configured to change a distance between the second belt reversing portion and the first pressing portion; a second stretched portion configured to include a third belt reversing portion positioned to face the first belt reversing portion and having an arc-shaped outer peripheral surface, and a fourth belt reversing portion provided with a predetermined gap between the third belt reversing portion and the fourth belt reversing portion, disposed to face the second belt reversing portion, and having an arc-shaped outer peripheral surface formed on an opposite side of a side of the third belt reversing portion; one or more second belts, each of the one or more second belts being configured to be made of materials having different coefficients of friction, to have a side with a smaller coefficient of friction that is brought into contact with the arc-shaped outer peripheral surfaces of the third belt reversing portion and the fourth belt reversing portion, and to be stretched in a ring shape to be freely circulated around the second stretched portion; a second pressing portion configured to be provided between the third belt reversing portion and the fourth belt reversing portion and adjacent to the third belt reversing portion, and to be brought into contact with the side with the smaller coefficient of friction of the one or more second belts by a predetermined length; and a second tension adjusting portion configured to change a distance between the fourth belt reversing portion and the second pressing portion.

Here, there may be provided a structure in which one or more first belts are stretched and maintained by the first stretched portion having the first belt reversing portion and the second belt reversing portion; and the one or more first belts, each of the one or more first belts configured to be made of materials having different coefficients of friction, to have a side with a smaller coefficient of friction that is brought into contact with the arc-shaped outer peripheral surfaces of the first belt reversing portion and the second belt reversing portion, and to be stretched in a ring shape to be freely circulated around the first stretched portion. In addition, the one or more first belts are stretched to be freely circulated around the outer peripheral surface of the first stretched portion.

Also, there may be provided a structure in which one or more second belts are stretched and maintained by the second stretched portion having the third belt reversing portion and the fourth belt reversing portion; and the one or more second belts, each of the one or more second belts being configured to be made of materials having different coefficients of friction, to have a side with a smaller coefficient of friction that is brought into contact with the arc-shaped outer peripheral surfaces of the third belt reversing portion and the fourth belt reversing portion, and to be stretched in a ring shape to be freely circulated around the second stretched portion. In addition, the one or more second belts are stretched to be freely circulated around the outer peripheral surface of the second stretched portion.

Also, the one or more first belts may be smoothly circulated along the arc-shaped outer peripheral surfaces of the first belt reversing portion and the second belt reversing portion by the first belt reversing portion having an arc-shaped outer peripheral surface; and the second belt reversing portion disposed with a predetermined gap between the first belt reversing portion and the second belt reversing portion and having an arc-shaped outer peripheral surface formed on an opposite side of a side of the first belt reversing portion.

Also, one or more second belts may be smoothly circulated along the arc-shaped outer peripheral surfaces of the third belt reversing portion and the fourth belt reversing portion by the third belt reversing portion having an arc-shaped outer peripheral surface; and the fourth belt reversing portion provided with a predetermined gap between the third belt reversing portion and the fourth belt reversing portion and having an arc-shaped outer peripheral surface formed on an opposite side of a side of the third belt reversing portion.

The first stretched portion and the second tension adjusting portion may be positioned to face each other by the first stretched portion having the first belt reversing portion and the second belt reversing portion disposed with a predetermined gap between the first belt reversing portion and the second belt reversing portion; and the second stretched portion having the third belt reversing portion positioned to face the first belt reversing portion and the fourth belt reversing portion provided with a predetermined gap between the third belt reversing portion and the fourth belt reversing portion and disposed to face the second belt reversing portion.

Also, each of stretched belts may be pressed from the side with the smaller coefficient of friction of each of belts and a slit band sheet to be conveyed may be clamped by the first pressing portion provided between the first belt reversing portion and the second belt reversing portion and being brought into contact with the side with the smaller coefficient of friction of the one or more first belts by a predetermined length; and the second pressing portion provided between the third belt reversing portion and the fourth belt reversing portion and being brought into contact with the side with the smaller coefficient of friction of the one or more second belts by a predetermined length. That is, with a combination of the one or more first belts and the first pressing portion and a combination of the one or more second belts and the second pressing portion, a conveying path for the band sheet may be provided therebetween so that the second pressing portion is brought close to the first pressing portion (or the first pressing portion is brought close to the second pressing portion), thereby clamping the band sheet between the respective belts. In addition, the predetermined length mentioned here refers to a length at which a contact pressure is generated such that a coiling tension can be sufficiently imparted to the band sheet which will be described later.

Also, a coiling tension may be imparted to the slit band sheet to be conveyed by the one or more first belts, each of the one or more first belts being configured to be made of materials having different coefficients of friction, to have a side with a smaller coefficient of friction that is brought into contact with the arc-shaped outer peripheral surfaces of the first belt reversing portion and the second belt reversing portion, and to be stretched in a ring shape to be freely circulated around the first stretched portion; the first pressing portion configured to be brought into contact with the side with the smaller coefficient of friction of the one or more first belts by a predetermined length; the one or more second belts, each of the one or more second belts being configured to be made of materials having different coefficients of friction, to have a side with a smaller coefficient of friction that is brought into contact with the arc-shaped outer peripheral surfaces of the third belt reversing portion and the fourth belt reversing portion, and to be stretched in a ring shape to be freely circulated around the second stretched portion; and the second pressing portion configured to be brought into contact with the side with the smaller coefficient of friction of the one or more second belts by a predetermined length. That is, the sides with the smaller coefficients of friction of the one or more first belts and the one or more second belts may be pressed by the first pressing portion and the second pressing portion, and the band sheet on a surface of a side with a larger coefficient of friction of each of belts may be clamped. The band sheet may be brought into contact with the side with the larger coefficient of friction of the belts so that the belts may be circulated along the movement of the band sheet, and slippage and a frictional force may be generated between the side with the smaller coefficient of friction of the belts and the pressing portion so that a coiling tension on the band sheet may be obtained. In addition, the slit band sheet mentioned here indicates a metal material which has been slit in a known slitter line, has been processed into multiple band sheets in a state of a wide metal plate, and has been conveyed through the slitter line.

Also, the inner surface of the stretched first belts may be supported even by the portion of the first pressing portion by the first pressing portion configured to be provided adjacent to the first belt reversing portion and to be brought into contact with the side with the smaller coefficient of friction of the one or more first belts by a predetermined length, so that a meandering phenomenon does not easily occur when the one or more first belts are circulated. In addition, since the first pressing portion and the first belt reversing portion are adjacent to each other, the one or more first belts can be supported more stably.

Also, the inner surface of the stretched second belts may be supported even by the portion of the second pressing portion by the second pressing portion configured to be provided adjacent to the third belt reversing portion and to be brought into contact with the one or more second belts by a predetermined length, so that a meandering phenomenon does not easily occur when the one or more second belts is circulated. In addition, since the second pressing portion and the third belt reversing portion are adjacent to each other, the one or more second belts can be supported more stably.

Also, the degree of tension of the one or more first belts may be adjusted by the first tension adjusting portion configured to change a distance between the second belt reversing portion and the first pressing portion. That is, by adjusting the degree of tension of the contracted first belts, it is possible to prevent the rotation failure in the circulation motion of the one or more first belts from easily occurring. As a result, it is possible to reduce a defect that slippage marks are formed on the slit band sheet by the one or more first belt. In addition, by changing the degree of tension in a direction in which the one or more first belt are relaxed, it is possible to easily replace the worn-out belt or replace the mounting position between a plurality of first belts juxtaposed with each other. Further, the change in the distance between the first pressing portion and the second belt reversing portion is a change in the distance in the horizontal direction, and is different from a direction (vertical direction) in which the first pressing portion presses the one or more first belt, and therefore the influence of the adjustment of the degree of tension of the one or more first belts cannot be easily caused by the generation of the frictional force due to the slippage between the first pressing portion and the side with the smaller coefficient of friction of the one or more first belts. Further, even when the belts are rotated at a high speed so that an inertial force in a direction of flow of a metal band sheet acts on the belts, it is possible to maintain the adhesion of the belts at the reversing portion on a side (advancing side) on which the band sheet is passed. As a result, the straightness of the circulation motion of the belts may be ensured and the belts may not be easily shaken, so that the contact between the adjacent band sheets can be suppressed. In addition, for example, when a cooling structure of the belts are installed inside the reversing portion on the side (advancing side) on which the band sheet is passed, the adhesion of the belts to the reversing portion are maintained, so that the cooling efficiency of the belts can be increased and the durability of the belts can be improved.

Also, the degree of tension of the one or more second belts may be adjusted by the second tension adjusting portion configured to change a distance between the fourth belt reversing portion and the second pressing portion. That is, by adjusting the degree of tension of the contracted second belts, it is possible to prevent the rotation failure in the circulation motion of the one or more second belts from easily occurring. As a result, it is possible to reduce a defect that slippage marks are formed on the slit band sheet by the one or more second belts. In addition, by changing the degree of tension in a direction in which the one or more second belts are relaxed, it is possible to easily replace the worn-out belt or replace the mounting position between a plurality of second belts juxtaposed with each other. Further, the change in the distance between the second pressing portion and the fourth belt reversing portion is a change in the distance in the horizontal direction, and is different from a direction (vertical direction) in which the second pressing portion presses the one or more second belts, and therefore the influence of the adjustment of the degree of tension of the one or more second belts cannot be easily caused by the generation of the frictional force due to the slippage between the second pressing portion and the side with the smaller coefficient of friction of the one or more second belts. Further, even when the belts are rotated at a high speed so that an inertial force in a direction of flow of a metal band sheet acts on the belts, it is possible to maintain the adhesion of the belts at the reversing portion on a side (advancing side) on which the band sheet is passed. As a result, the straightness of the circulation motion of the belts may be ensured and the belts may not be easily shaken, so that the contact between the adjacent band sheets can be suppressed. In addition, for example, when a cooling structure of the belts are installed inside the reversing portion on the side (advancing side) on which the band sheet is passed, the adhesion of the belts to the reversing portion is maintained, so that the cooling efficiency of the belts can be increased and the durability of the belts can be improved.

Also, when the first belt reversing portion and the third belt reversing portion are disposed on an entry side of a band sheet that flows through a metal slitter line, the band sheet flows into a region where the one or more first belt and the one or more second belt are stably supported, which refers to a region composed of the first belt reversing portion and the first pressing portion and a region composed of the third belt reversing portion and the second pressing portion, and enters between the first pressing portion and the second pressing portion. As a result, the band sheet stably fits to the one or more first belt and the one or more second belt at the entry side, and the straightness of the flow of the band sheet that is passed can be enhanced. By increasing the straightness of the flow of the band sheet, it is possible to properly impart the coiling tension.

Also, when the inside of each of the first belt reversing portion, the second belt reversing portion, the third belt reversing portion, and the fourth belt reversing portion is configured to be capable of being cooled, the heated first belts and second belts may be capable of being cooled. That is, the belt temperature is raised by frictional heat generated when each pressing portion presses the side with the smaller coefficient of friction of each of belts, but the inner side of the circulated belts is brought into contact with the first belt reversing portion and the second belt revering portion, or the third belt reversing portion and the fourth belt reversing portion, so that the heat can be efficiently removed.

Also, when each of the first belt reversing portion, the second belt reversing portion, the third belt reversing portion, and the fourth belt reversing portion has an inner cylinder portion and an outer cylinder portion substantially surrounding the inner cylinder portion, and is configured to allow cooling water to be circulated between the inner cylinder portion and the outer cylinder portion, the heat of the one or more first belt and the one or more second belt can be removed by the cooling water. Further, for example, a region where the cooling water inserted into the inner cylinder portion and the outer cylinder portion flows is provided in the vicinity of the outer peripheral surface side of each belt reversing portion, so that the cooling efficiency can be further increased.

In accordance with another aspect of the present invention, there is provided a device for applying coiling-tension to a slit band sheet including: a first stretched portion configured to include a first belt reversing portion having an arc-shaped outer peripheral surface, and a second belt reversing portion disposed with a predetermined gap between the first belt reversing portion and the second belt reversing portion and having an arc-shaped outer peripheral surface formed on an opposite side of a side of the first belt reversing portion; one or more first belts, each of the one or more first belts being configured to be made of materials having different coefficients of friction, to have a side with a smaller coefficient of friction that is brought into contact with the arc-shaped outer peripheral surfaces of the first belt reversing portion and the second belt reversing portion, and to be stretched in a ring shape to be freely circulated around the first stretched portion; a first pressing portion configured to be disposed with a predetermined gap between the first belt reversing portion and the second belt reversing portion, and to be brought into contact with the side with the smaller coefficient of friction of the one or more first belts by a predetermined length; a first tension adjusting portion configured to change a distance between the first belt reversing portion and the first pressing portion and a distance between the second belt reversing portion and the first pressing portion; a second stretched portion configured to include a third belt reversing portion positioned to face the first belt reversing portion and having an arc-shaped outer peripheral surface, and a fourth belt reversing portion provided with a predetermined gap between the third belt reversing portion and the fourth belt reversing portion, disposed to face the second belt reversing portion, and having an arc-shaped outer peripheral surface formed on an opposite side of a side of the second belt reversing portion; one or more second belts, each of the one or more second belts being configured to be made of materials having different coefficients of friction, to have a side with a smaller coefficient of friction that is brought into contact with the arc-shaped outer peripheral surfaces of the third belt reversing portion and the fourth belt reversing portion, and to be stretched in a ring shape to be freely circulated around the second stretched portion; a second pressing portion configured to be disposed with a predetermined gap between the third belt reversing portion and the fourth belt reversing portion, and to be brought into contact with the side with the smaller coefficient of friction of the one or more second belts by a predetermined length; and a second tension adjusting portion configured to change a distance between the third belt reversing portion and the second pressing portion and a distance between the fourth belt reversing portion and the second pressing portion.

Here, there may be provided a structure in which the one or more first belts are stretched and maintained by the first stretched portion having the first belt reversing portion and the second belt reversing portion; and the one or more first belts, each of the one or more first belts configured to be made of materials having different coefficients of friction, to have a side with a smaller coefficient of friction that is brought into contact with the arc-shaped outer peripheral surfaces of the first belt reversing portion and the second belt reversing portion, and to be stretched in a ring shape to be freely circulated around the first stretched portion. In addition, the one or more first belts are stretched to be freely circulated around the outer peripheral surface of the first stretched portion.

Also, there may be provided a structure in which the one or more second belts are stretched and maintained by the second stretched portion having the third belt reversing portion and the fourth belt reversing portion; and one or more second belts, each of the one or more second belts being configured to be made of materials having different coefficients of friction, to have a side with a smaller coefficient of friction that is brought into contact with the arc-shaped outer peripheral surfaces of the third belt reversing portion and the fourth belt reversing portion, and to be stretched in a ring shape to be freely circulated around the second stretched portion. In addition, the one or more second belts are stretched to be freely circulated around the outer peripheral surface of the second stretched portion.

Also, the one or more first belts may be smoothly circulated along the arc-shaped outer peripheral surfaces of the first belt reversing portion and the second belt reversing portion by the first belt reversing portion having an arc-shaped outer peripheral surface; and the second belt reversing portion disposed with a predetermined gap between the first belt reversing portion and the second belt reversing portion and having an arc-shaped outer peripheral surface formed on an opposite side of a side of the first belt reversing portion.

Also, the one or more second belts may be smoothly circulated along the arc-shaped outer peripheral surfaces of the third belt reversing portion and the fourth belt reversing portion by the third belt reversing portion having an arc-shaped outer peripheral surface; and the fourth belt reversing portion provided with a predetermined gap between the third belt reversing portion and the fourth belt reversing portion and having an arc-shaped outer peripheral surface formed on an opposite side of a side of the third belt reversing portion.

The first stretched portion and the second tension adjusting portion may be positioned to face each other by the first stretched portion having the first belt reversing portion and the second belt reversing portion disposed with a predetermined gap between the first belt reversing portion and the second belt reversing portion; and the second stretched portion having the third belt reversing portion positioned to face the first belt reversing portion and the fourth belt reversing portion provided with a predetermined gap between the third belt reversing portion and the fourth belt reversing portion and disposed to face the second belt reversing portion.

Also, each of stretched belts may be pressed from the side with the smaller coefficient of friction of each of belts and a slit band sheet to be conveyed may be clamped by the first pressing portion provided between the first belt reversing portion and the second belt reversing portion and being brought into contact with the side with the smaller coefficient of friction of the one or more first belts by a predetermined length; and the second pressing portion provided between the third belt reversing portion and the fourth belt reversing portion and being brought into contact with the side with the smaller coefficient of friction of the one or more second belts by a predetermined length. That is, with a combination of the one or more first belts and the first pressing portion and a combination of the one or more second belts and the second pressing portion, a conveying path for the band sheet may be provided therebetween so that the second pressing portion is brought close to the first pressing portion (or the first pressing portion is brought close to the second pressing portion), thereby clamping the band sheet between the respective belts. In addition, the predetermined length mentioned here refers to a length at which a contact pressure is generated such that a coiling tension can be sufficiently imparted to the band sheet which will be described later.

Also, a coiling tension may be imparted to the slit band sheet to be conveyed by the one or more first belts, each of the one or more first belts being configured to be made of materials having different coefficients of friction, to have a side with a smaller coefficient of friction that is brought into contact with the arc-shaped outer peripheral surfaces of the first belt reversing portion and the second belt reversing portion, and to be stretched in a ring shape to be freely circulated around the first stretched portion; the first pressing portion configured to be brought into contact with the side with the smaller coefficient of friction of the one or more first belts by a predetermined length; the one or more second belts, each of the one or more second belts being configured to be made of materials having different coefficients of friction, to have a side with a smaller coefficient of friction that is brought into contact with the arc-shaped outer peripheral surfaces of the third belt reversing portion and the fourth belt reversing portion, and to be stretched in a ring shape to be freely circulated around the second stretched portion; and the second pressing portion configured to be brought into contact with the side with the smaller coefficient of friction of the one or more second belts by a predetermined length. That is, the sides with the smaller coefficients of friction of the one or more first belts and the one or more second belts may be pressed by the first pressing portion and the second pressing portion, and the band sheet on a surface of a side with a larger coefficient of friction of each of belts may be clamped. The band sheet may be brought into contact with the side with the larger coefficient of friction of each of the belts so that the belts may be circulated along the movement of the band sheet, and slippage and a frictional force may be generated between the side with the smaller coefficient of friction of the belts and the pressing portion so that a coiling tension on the band sheet may be obtained. In addition, the slit band sheet mentioned here indicates a metal material which has been slit in a known slitter line, has been processed into multiple band sheets in a state of a wide metal plate, and has been conveyed through the slitter line.

Also, the degree of tension of the one or more first belts may be adjusted by the first pressing portion configured to be disposed with a predetermined gap between the first belt reversing portion and the second belt reversing portion; and the first tension adjusting portion configured to change a distance between the first belt reversing portion and the first pressing portion and a distance between the second belt reversing portion and the first pressing portion. That is, by adjusting the degree of tension of the contracted first belts, it is possible to prevent the rotation failure in the circulation motion of the one or more first belts from easily occurring. As a result, it is possible to reduce a defect that slippage marks are formed on the slit band sheet by the one or more first belts. In addition, by changing the degree of tension in a direction in which the one or more first belts are relaxed, it is possible to easily replace the worn-out belt or replace the mounting position between a plurality of first belts juxtaposed with each other. Further, the change in the distance between the first pressing portion and the second belt reversing portion is a change in the distance in the horizontal direction, and is different from a direction (vertical direction) in which the first pressing portion presses the one or more first belts, and therefore the influence of the adjustment of the degree of tension of the one or more first belts cannot be easily caused by the generation of the frictional force due to the slippage between the first pressing portion and the side with the smaller coefficient of friction of the one or more first belts. Further, since the distance between both the first belt reversing portion and the second belt reversing portion can be changed, a range of adjustment of the degree of tension of the one or more first belts, particularly, a changing range of a direction of increasing the degree of tension can be made wider. In addition, since the one or more first belts are tensed at both ends of the first stretched portion, it is easy to uniformly apply a force to the one or more first belts, so that the one or more first belts can be more stably circulated.

Also, the degree of tension of the one or more second belts may be adjusted by the second pressing portion configured to be disposed with a predetermined gap between the third belt reversing portion and the fourth belt reversing portion; and the second tension adjusting portion configured to change a distance between the third belt reversing portion and the second pressing portion and a distance between the fourth reversing portion and the second pressing portion. That is, by adjusting the degree of tension of the contracted second belts, it is possible to prevent the rotation failure in the circulation motion of the one or more second belts from easily occurring. As a result, it is possible to reduce a defect that slippage marks are formed on the slit band sheet by the one or more second belts. In addition, by changing the degree of tension in a direction in which the one or more second belts are relaxed, it is possible to easily replace the worn-out belt or replace the mounting position between a plurality of second belts juxtaposed with each other. Further, the change in the distance between the second pressing portion and each belt reversing portion is a change in the distance in the horizontal direction, and is different from a direction (vertical direction) in which the second pressing portion presses the one or more second belts, and therefore the influence of the adjustment of the degree of tension of the one or more second belts cannot be easily caused by the generation of the frictional force due to the slippage between the second pressing portion and the side with the smaller coefficient of friction of the one or more second belts. Further, since the distance between both the third belt reversing portion and the fourth belt reversing portion can be changed, a range of adjustment of the degree of tension of the one or more second belts, particularly, a changing range of a direction of increasing the degree of tension can be made wider. In addition, since the one or more second belt are tensed at both ends of the second stretched portion, it is easy to uniformly apply a force to the one or more second belts, so that the one or more second belts can be more stably circulated.

Also, the first pressing portion may be disposed with a predetermined gap between the first belt reversing portion and the second belt reversing portion and the second pressing portion may be disposed with a predetermined gap between the first belt reversing portion and the second belt reversing portion, so that the first pressing portion and the second pressing portion can be easily exchanged. That is, it is possible to change an area of each pressing portion by changing the respective pressing portions contacting the respective belts to have different lengths. This has the following advantages.

In the slit band sheet coiling tension applying device of the present invention, the first pressing portion or the second pressing portion may be driven in a direction in which both the first pressing portion and the second pressing portion are brought close to or away from each other, for example, the pressing portion may be connected to a hydraulic cylinder, so that the band sheet may be clamped at each pressing portion to generate a coiling tension. An appropriate coiling tension can be given to a surface pressure (Pa: a pressure per a unit area) at this time, and the surface pressure Pa can be adjusted to a range where damage or clamping marks are not easily generated on the surface of the band sheet and is determined by equation (Pa=P/A) (P: cylinder pressure (kg) and A: pressing portion area ($cm^2$)). Here, when the surface pressure is within a proper range, damage to each belt is reduced as a value of the surface pressure is reduced, so that the durability is improved and clamping marks are not easily generated on the band sheet.

When reducing the surface pressure, it is necessary to increase the cylinder pressure P or to reduce the pressing portion area A. As for the cylinder pressure P, it is conceivable to cope with the pressure adjustment of the hydraulic cylinder to be used. However, when the area of the pressing portion can be changed, the adjustment of the surface pressure can be further facilitated. In addition, as a result, it is possible to widen the object of a plate thickness of the band sheet which can be handled by the slit band sheet coiling tension applying device. That is, the first pressing portion may be disposed with a predetermined gap between the first belt reversing portion and the second reversing portion and the second pressing portion may be disposed with a predetermined gap between the third belt reversing portion and the fourth belt reversing portion, so that the first pressing portion and the second pressing portion may be exchanged, and the setting for reducing the surface pressure can be performed more simply. Further, the length of the portion of the first pressing portion (the second pressing portion) contacting the one or more first belts (one or more second belts) refers to a length of a portion in a direction substantially parallel to an advancing direction in which the band sheet flows.

Also, when the inside of each of the first belt reversing portion, the second belt reversing portion, the third belt reversing portion, and the fourth belt reversing portion is configured to be capable of being cooled, the heated first belts and second belts can be capable of being cooled. That is, the belt temperature is raised by frictional heat generated when each pressing portion presses the side with the smaller coefficient of friction of each belt, but the inner side of the circulated belts are brought into contact with the first belt reversing portion and the second belt revering portion, or the third belt reversing portion and the fourth belt reversing portion, so that the heat can be efficiently removed.

Also, when each of the first belt reversing portion, the second belt reversing portion, the third belt reversing portion, and the fourth belt reversing portion has an inner cylinder portion and an outer cylinder portion substantially surrounding the inner cylinder portion and is configured to allow cooling water to be circulated between the inner cylinder portion and the outer cylinder portion, the heat of the one or more first belts and the one or more second belts can be removed by the cooling water. Further, for example, a region where the cooling water inserted into the inner cylinder portion and the outer cylinder portion flows is provided in the vicinity of the outer peripheral surface side of each belt reversing portion, so that the cooling efficiency can be further increased.

Also, when the first belts are juxtaposed with an interval therebetween in the first stretched portion, and the second belts are juxtaposed with an interval therebetween in the second stretched portion, it is possible to impart a coiling tension to a plurality of band sheets by a combination of a plurality of belts.

Also, when each of the first belt reversing portion and the third belt reversing portion has a semi-cylindrical cross section in a longitudinal direction, the arc-shaped outer peripheral surface of the second belt reversing portion is formed to be smaller than the arc-shaped outer peripheral surface of the first belt reversing portion, and the arc-shaped outer peripheral surface of the fourth belt reversing portion is formed to be smaller than the arc-shaped outer peripheral surface of the third belt reversing portion, the first stretched portion and the second stretched portion may be reduced in size, and the overall size of the device can be made compact. In addition, since the second belt reversing portion and the fourth belt reversing portion are made smaller, a moving distance of each of the second belt reversing portion and the fourth belt reversing portion when the degree of tension of the belts are adjusted can be made long, as compared to when each of the second belt reversing portion and the fourth belt reversing portion is formed to have the same size as those of the first belt reversing portion and the fourth belt reversing portion. As a result, a range in which the degree of tension of the belts can be adjusted may be made wider.

Also, when the arc-shaped outer peripheral surfaces of the first belt reversing portion, the second belt reversing portion, the third belt reversing portion, and the fourth belt reversing portion are formed to be less than a circumference of a semicircle, the first stretched portion and the second stretched portion may be further reduced in size, and the overall size of the device can be made compact. In addition, since each reversing portion is made smaller, a moving distance of each reversing portion when the degree of tension of the belts are adjusted can be made long, as compared to when the cross section of each reversing portion is formed to be a semicircle. As a result, a range in which the degree of tension of the belts can be adjusted may be made wider.

Also, when the inside of each of the first reversing portion, the third reversing portion, the first pressing portion, and the second pressing portion is configured to be capable of being cooled, the heated first belts and second belts may be capable of being cooled.

Also, when the inside of each of the first pressing portion and the second pressing portion is configured to be capable of being cooled, the heated first belts and second belts may be capable of being cooled.

Advantageous Effects

A device for applying coiling-tension to a slit band sheet according to the present invention may be excellent in durability and improved in convenience in a slitter line of a metal band sheet.

MODE FOR CARRYING OUT THE INVENTION

Figure 1:
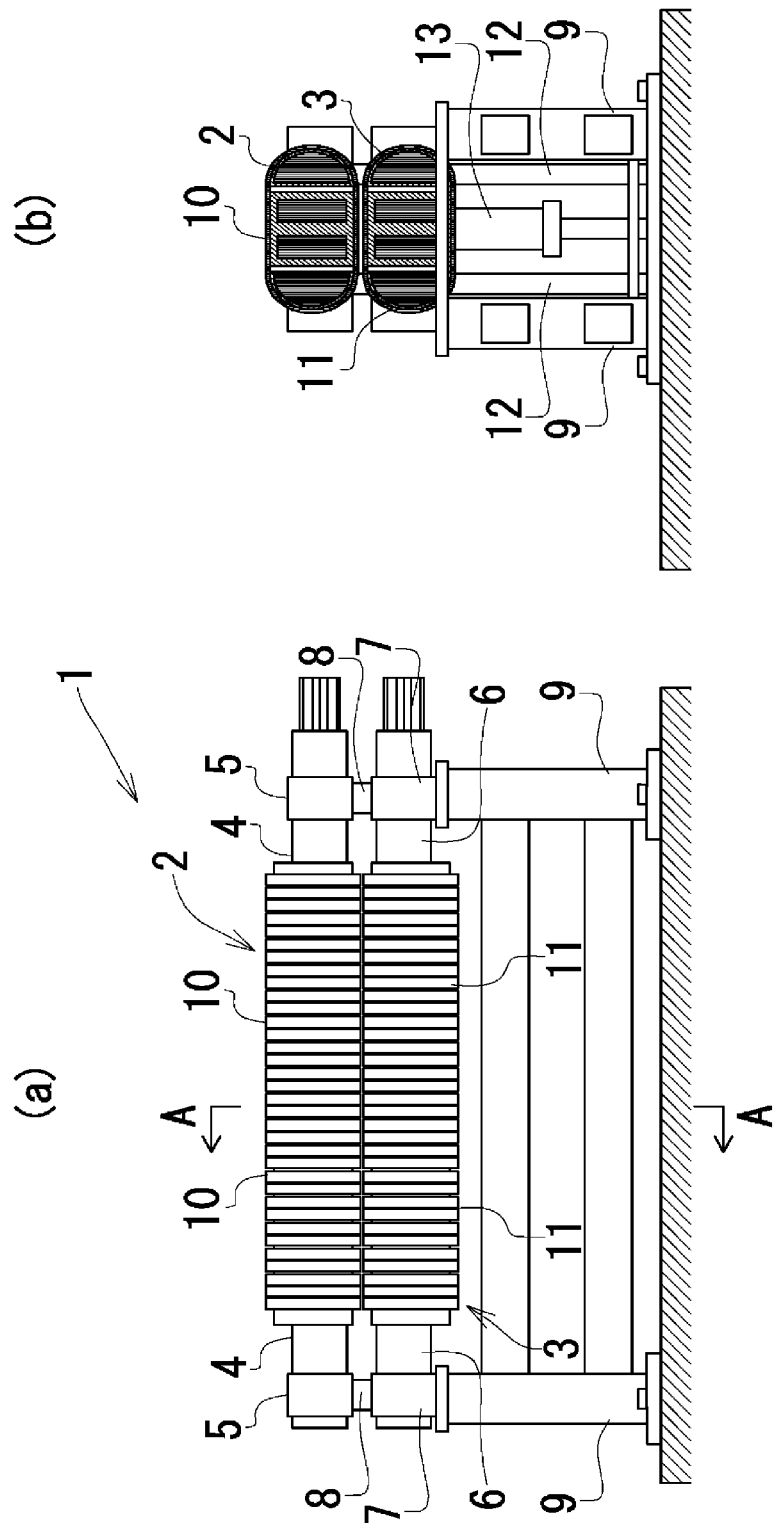
FIG. 1A is a front schematic view of a first embodiment of the present invention.
FIG. 1B is a schematic cross-sectional view in a direction of an arrow A of FIG. 1A.
Figure 2:
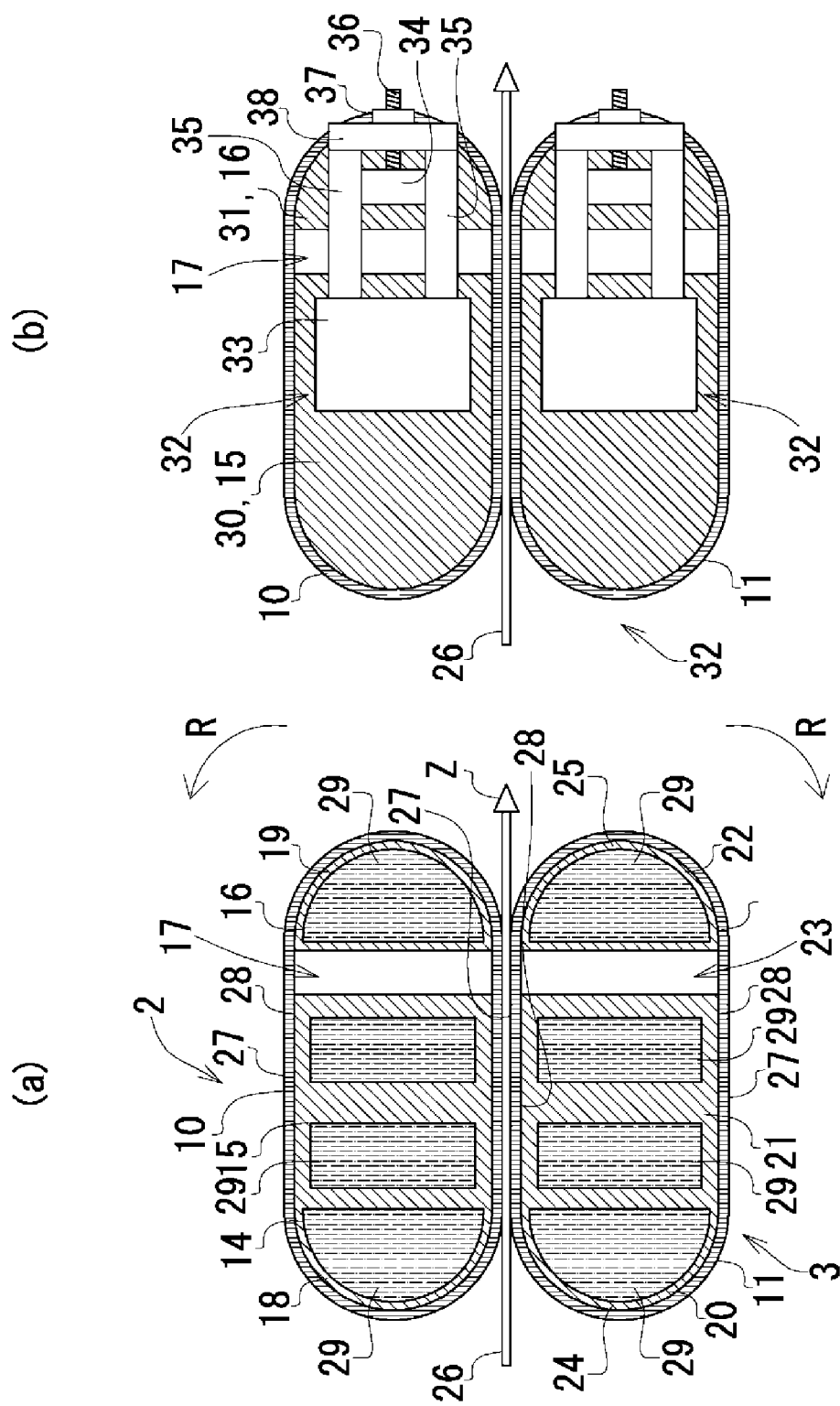
FIGS. 2A and 2B are a schematic cross-sectional view and a schematic side view showing an upper structure and a lower structure according to a first embodiment of the present invention.
Figure 3:
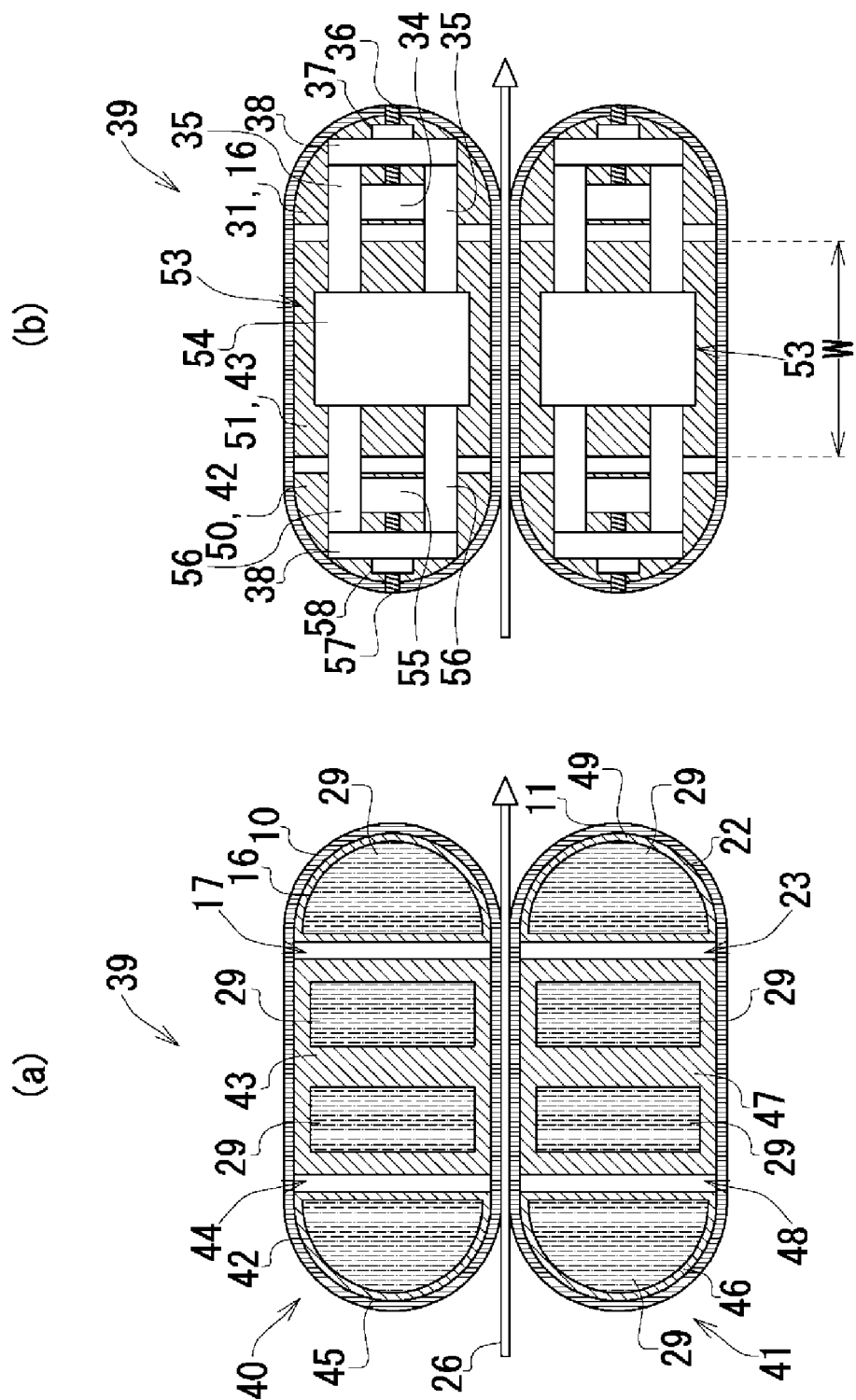
FIGS. 3A and 3B are a schematic cross-sectional view and a schematic side view showing an upper structure and a lower structure according to a second embodiment of the present invention.
Figure 4:
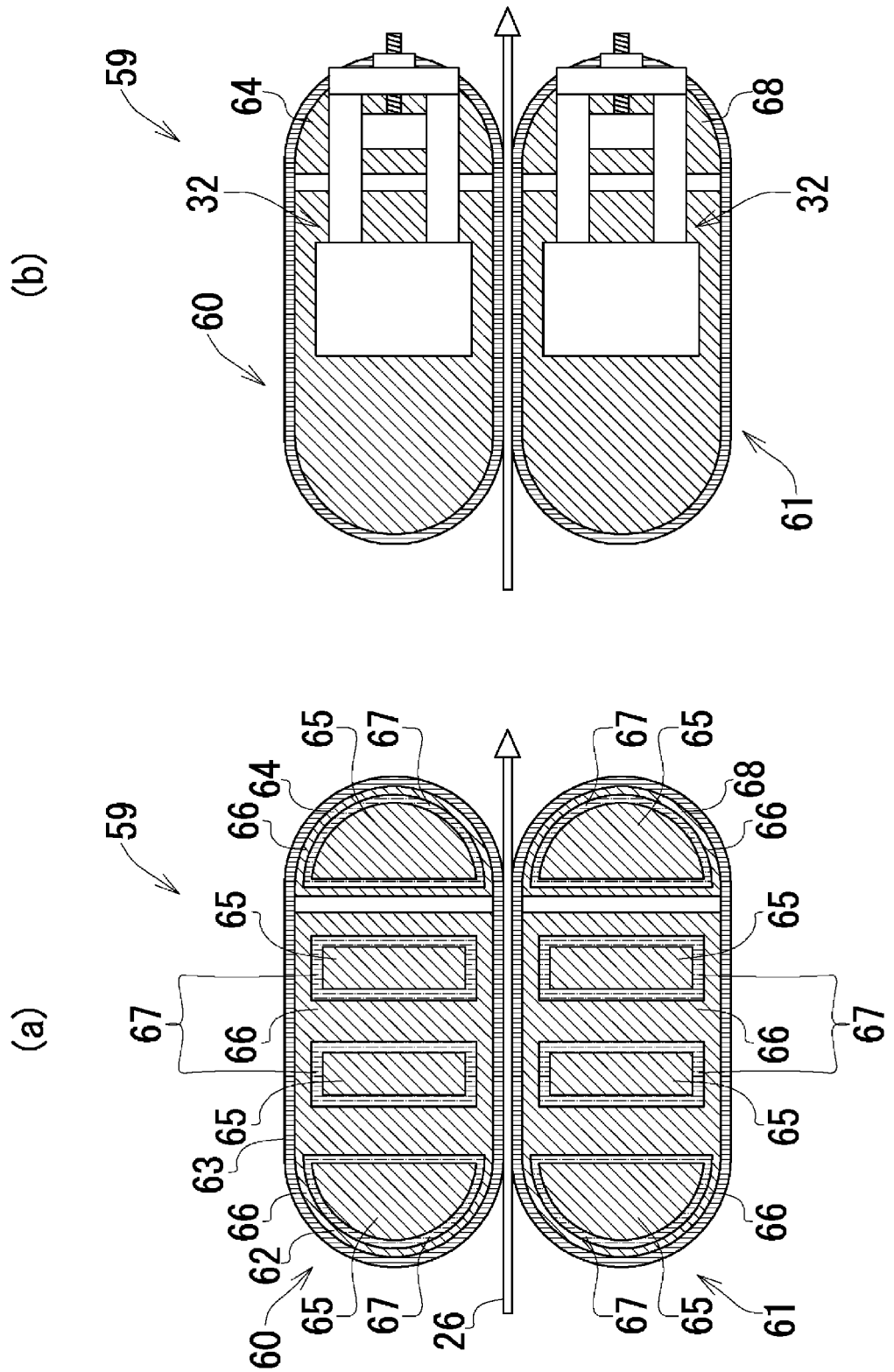
FIGS. 4A and 4B are a schematic cross-sectional view and a schematic side view showing an upper structure and a lower structure according to a third embodiment of the present invention.
Figure 5:
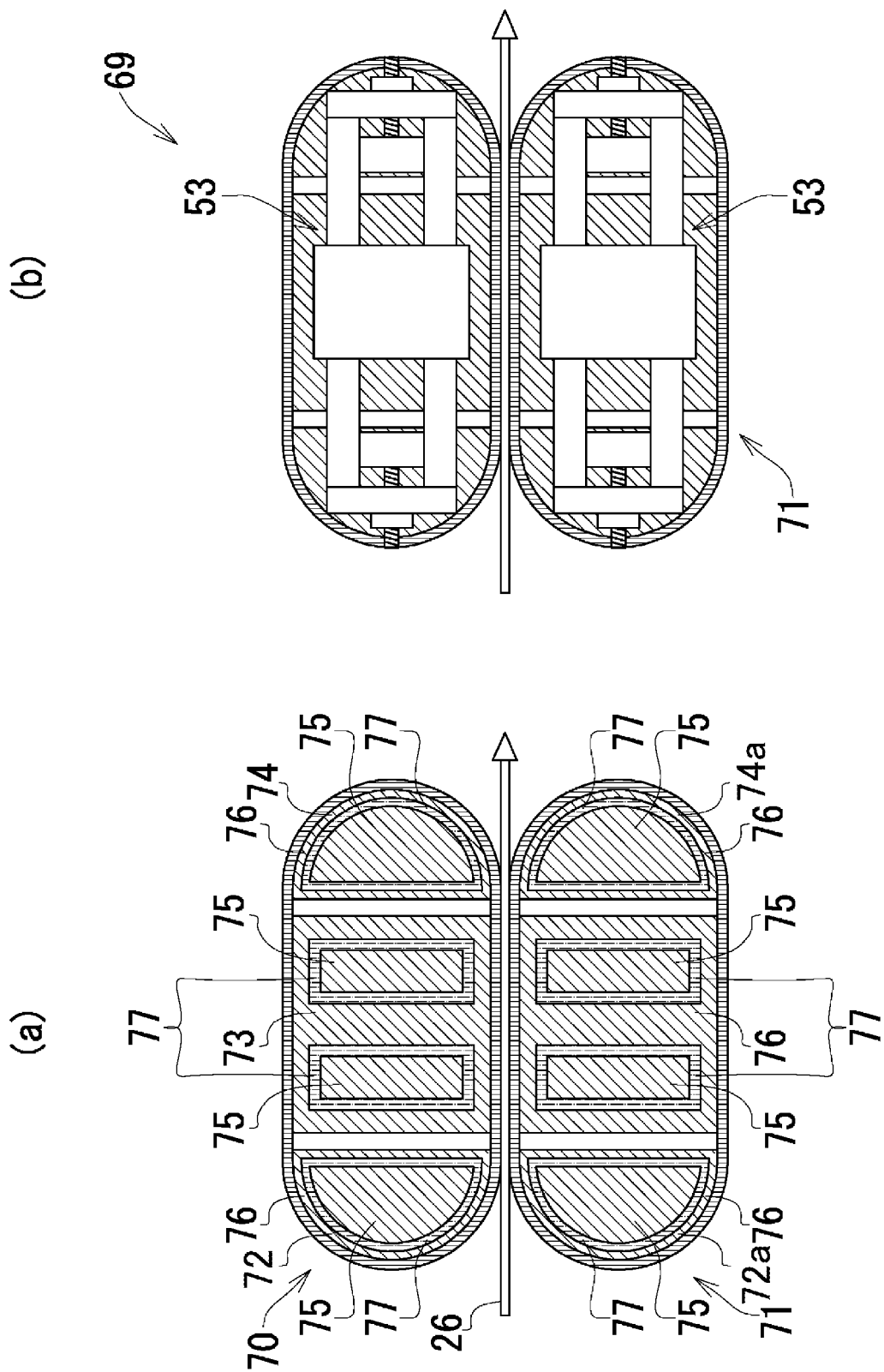
FIGS. 5A and 5B are a schematic cross-sectional view and a schematic side view showing an upper structure and a lower structure according to a fourth embodiment of the present invention.
Figure 6:
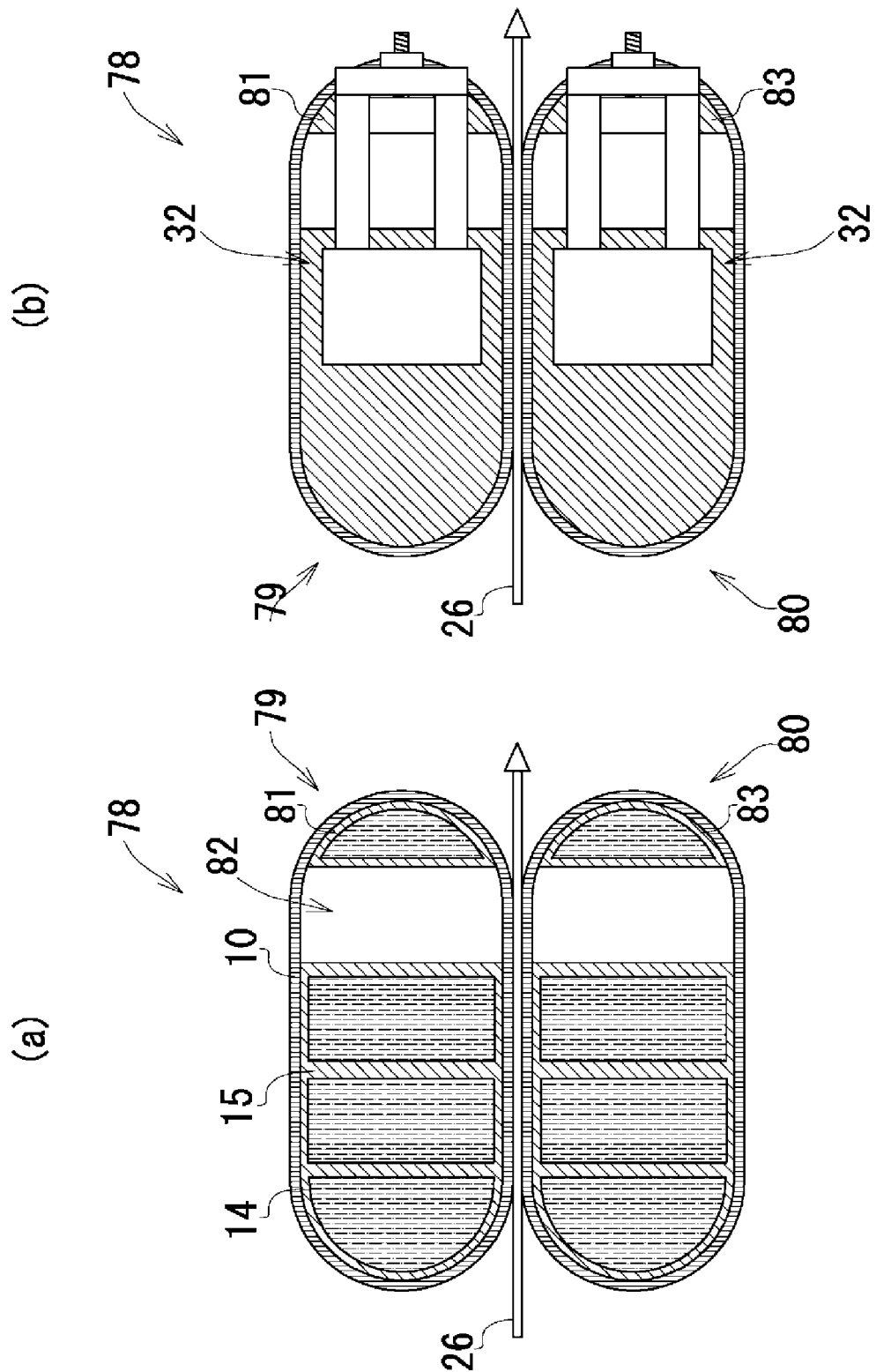
FIGS. 6A and 6B are a schematic cross-sectional view and a schematic side view showing an upper structure and a lower structure according to a fifth embodiment of the present invention.
Figure 7:
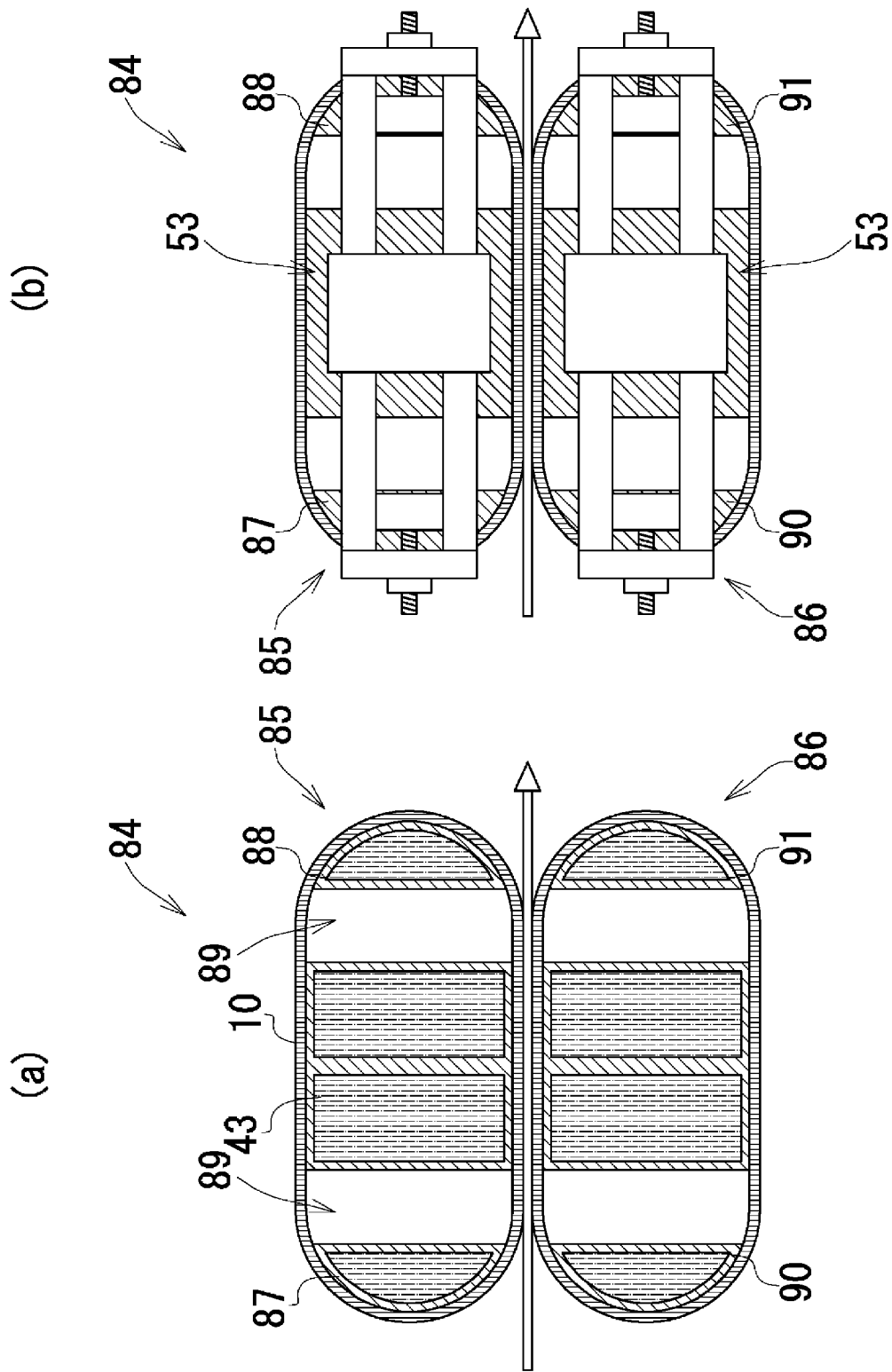
FIGS. 7A and 7B are a schematic cross-sectional view and a schematic side view showing an upper structure and a lower structure according to a sixth embodiment of the present invention.
Figure 8:
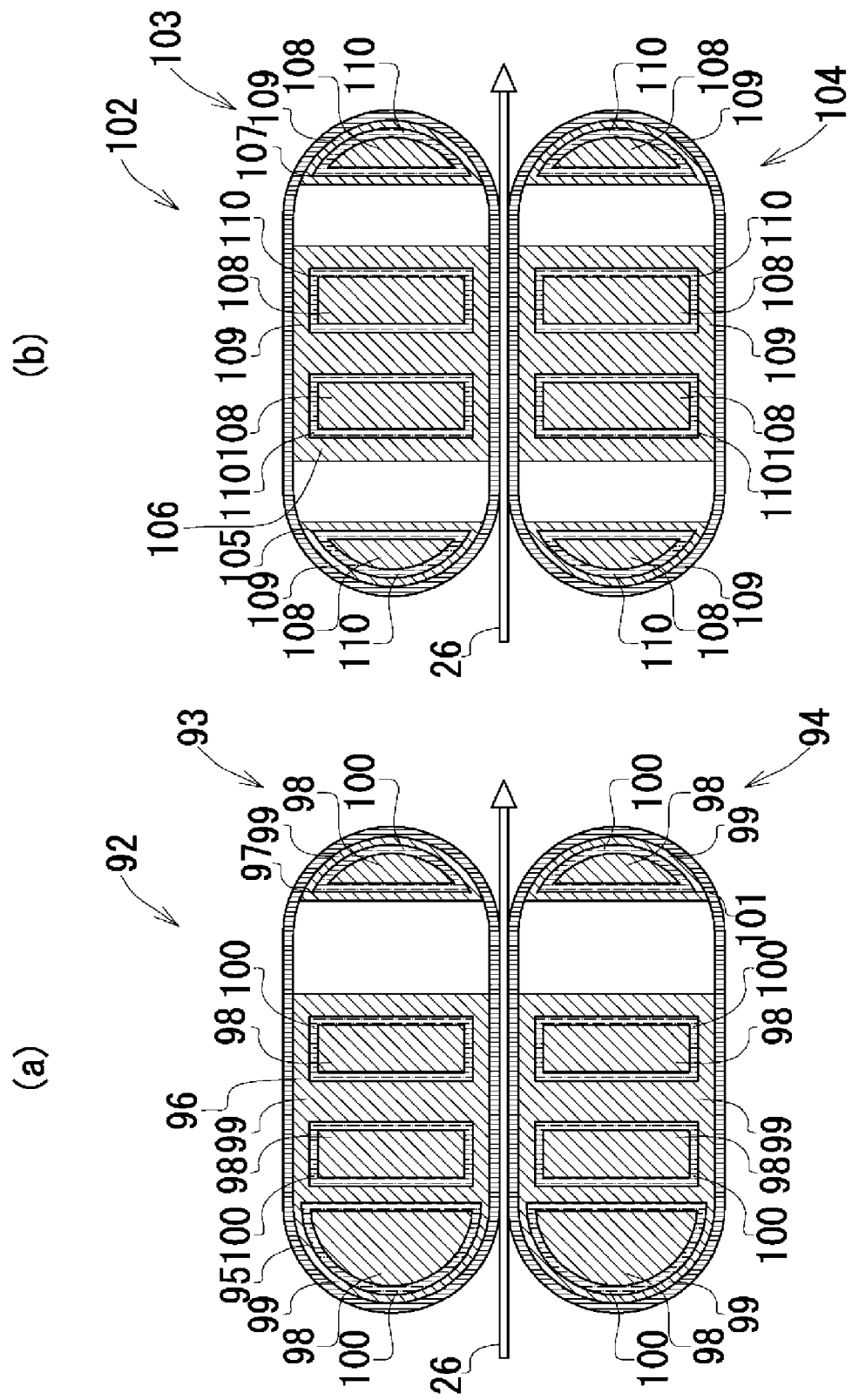
FIG. 8A is a schematic cross-sectional view showing an upper structure and a lower structure according to a seventh embodiment of the present invention.
FIG. 8B is a schematic cross-sectional view showing an upper structure and a lower structure according to an eighth embodiment of the present invention.

Hereinafter, embodiments of the present invention will be described with reference to the drawings to facilitate understanding of the present invention FIG. 1A is a front schematic view of a first embodiment of the present invention, and FIG. 1B is a schematic cross-sectional view in a direction of an arrow A of FIG. 1A, and FIGS. 2A and 2B are a schematic cross-sectional view and a schematic side view showing an upper structure and a lower structure according to a first embodiment of the present invention. In addition, the embodiment of the present invention is not limited to the following contents, but is merely an example. In addition, the drawings shown in FIGS. 1 to 10 show a schematic structure for explanation, and do not limit the size and scale of the structure in the present invention.

First Embodiment

As shown in FIG. 1A, a coiling tension applying device 1 according to a first embodiment of the present invention includes an upper structure 2 that is disposed above a band sheet which has been passed through a slitter line and slit, and a lower structure 3 that is disposed below the band sheet. The upper structure 2 and the lower structure 3 are disposed so as to face each other in the vertical direction.

The band sheet which has been slit means that a wide metal plate is slit into multiple band sheets in a known slitter line. Although not shown, the coiling tension applying device 1 is disposed in front of a winder of the band sheet in the known slitter line and applies a coiling tension to the band sheet.

The upper structure 2 is supported by a shaft body 4 and a bearing 5. Further, the lower structure 3 is supported by a shaft body 6 and a bearing 7. The bearing 5 and the bearing 7 are connected to each other by a support portion 8, and the bearing 7 is mounted on a stand portion 9 installed on the floor surface.

In addition, an upper belt 10 is stretched on an outer peripheral surface of the upper structure 2 so as to be freely circulated. A lower belt 11 is stretched on an outer peripheral surface of the lower structure 3 so as to be freely circulated. The upper belt 10 and the lower belt 11 act as a portion that allows a coiling tension to be exerted on the band sheet by clamping the band sheet passing therebetween in the vertical direction as shown in FIG. 1A.

A plurality of upper belts 10 is juxtaposed at regular intervals in the longitudinal direction of the upper structure 2. Protrusions which are not shown are provided between the adjacent upper belts 10 so as to define the positions of the upper belts 10. Similarly, a plurality of lower belts 11 is juxtaposed in the longitudinal direction of the lower structure 3 in the same manner.

As shown in FIG. 1B, the stand portion 9 has an elevating mechanism composed of an elevating rod 12 and a hydraulic cylinder 13. The elevating mechanism is a driving unit that makes the upper structure 2 movable forward and backward in the vertical direction, and is a portion that raises and lowers the upper structure 2 and brings it close to or away from the lower structure 3. By this elevating mechanism, in a state in which the upper structure 2 and the lower structure 3 are close to each other, each of the pressing portions described later presses the upper belt 10 or the lower belt 11 so that each belt is brought into contact with the band sheet. Further, the elevating mechanism is a portion that raises and lowers the upper pressing portion.

In addition, as shown in FIG. 1B, the upper structure 2 on which the upper belt 10 is stretched has an elliptical cross section. Similarly, the lower structure 3 on which the lower belt 11 is stretched has an elliptical cross section.

Here, the lower structure 3 does not necessarily have to be raised and lowered by the elevating mechanism. For example, a structure in which the lower structure 3 is fixed and the upper structure 2 is driven by the elevating mechanism can be adopted.

A detailed structure of the upper structure 2 and the lower structure 3 will be described with reference to FIGS. 2A and 2B.

The upper structure 2 has a first reversing portion 14, an upper pressing portion 15, and a second reversing portion 16. The first reversing portion 14 and the upper pressing portion 15 are integrated with each other. Further, a gap 17 is formed between the upper pressing portion 15 and the second reversing portion 16.

The upper belt 10 is stretched in an elliptical cross section thereof by the first reversing portion 14 and the second reversing portion 16. The upper belt 10 can be circulated on the outer peripheral surfaces of the first reversing portion 14, the upper pressing portion 15, and the second reversing portion 16.

The first reversing portion 14 has an arc-shaped outer peripheral surface 18 and contacts the inner side of the upper belt 10 at the same portion. The second reversing portion 16 also has an arc-shaped outer peripheral surface 19 and contacts the inner side of the upper belt 10 at the same portion. Since the upper belt 10 is circulated while coming into contact with each arc-shaped outer peripheral surface, smooth movement is possible. Further, the first reversing portion 14 and the second reversing portion 16 do not contribute to the driving of the circulation motion of the upper belt 10, and the upper belt 10 is circulated by the contact with a band sheet which will be described later.

The lower structure 3 has a third reversing portion 20, a lower pressing portion 21, and a fourth reversing portion 22. The third reversing portion 20 and the lower pressing portion 21 are integrated with each other. Further, a gap 23 is formed between the lower pressing portion 21 and the fourth reversing portion 22.

As in the upper belt 10, the lower belt 11 is stretched in an elliptical cross section thereof by the third reversing portion 20 and the fourth reversing portion 22. The lower belt 11 can be also circulated on outer peripheral surfaces of the third reversing portion 20, the lower pressing portion 21, and the fourth reversing portion 22.

The third reversing portion 20 has an arc-shaped outer peripheral surface 24 and contacts the inner side of the lower belt 11 at the same portion. The fourth reversing portion 22 also has an arc-shaped outer peripheral surface 25 and contacts the inner side of the lower belt 11 at the same portion. Since the lower belt 11 is circulated while coming into contact with each arc-shaped outer peripheral surface, smooth movement is possible. Further, the third reversing portion 21 and the fourth reversion portion 22 do not contribute to the driving of the circulation motion of the lower belt 11, and the lower belt 11 is also circulated by the contact with a band sheet which will be described later.

The upper belt 10 and the lower belt 11 interlock with the upper pressing portion 15 and the lower pressing portion 21 to impart a coiling tension to a band sheet 26. The upper belt 10 and the lower belt 11 come into contact with the band sheet 26 at an outer surface 27 thereof and at the same time, come into contact with the respective pressing portions and the respective reversing portions on an inner surface 28 thereof. A direction indicated by an arrow Z in FIG. 2A is a direction in which the band sheet 26 is passed between the upper structure and the lower structure. Further, the coiling tension on the band sheet 26 is generated in a direction opposite the arrow Z.

Each of the upper pressing portion 15 and the lower pressing portion 21 has a rectangular cross section or a substantially square cross section, and is brought into contact with the inner surface 28 of each belt by a predetermined length in a direction in which the band sheet 26 is passed between the upper structure and the lower structure. In addition, the upper pressing portion 15 (including the first reversing portion 14) and the lower pressing portion 21 (including the third reversing portion) press the inner surface 28 of each belt in a direction in which a distance between the upper and lower pressing portions is reduced by the lifting and lowering of the hydraulic cylinder 13, that is, a direction in which the band sheet 26 is clamped. Further, by adjusting a pressing force of the hydraulic cylinder, the coiling tension of the band sheet can be adjusted.

Each of the upper belt 10 and the lower belt 11 has an outer side and an inner side made of different materials from each other, and a coefficient of friction of the material of the outer side is larger than that of the material of the inner side.

More specifically, the inner surface 28 of each belt is formed of woven fabric of synthetic fibers such as polyester, vinylon, nylon, and the like. A lubricant for reducing a coefficient of friction can be impregnated in the interstices of the woven fabric and in recessed portions of meshes thereof.

In addition, the outer surface 27 of each belt is made of a relatively thin flexible material having appropriate compressive elasticity, for example, rubber or synthetic resin, so as not to stick pressure marks on the surface of the band sheet.

Here, it is sufficient that the material of the inner surface 28 of each belt has a smaller coefficient of friction than that of the outer surface, and the material of the inner surface 28 is not limited. However, it is preferable that the inner surface 28 of each belt be formed of woven fabric of synthetic fibers such as polyester, vinylon, nylon, and the like in that the woven fabric of synthetic fibers is easy to be obtained, has flexibility, and can be easily adjusted to set a coefficient of friction to a constant value.

In addition, it is sufficient that the material of the outer surface 27 of each belt has a larger coefficient of friction than that of the inner surface 28, and the material of the outer surface 27 is not limited. However, it is preferable that the outer surface 27 of each belt be made of rubber, synthetic resin, or the like in that the rubber or synthetic resin has a high coefficient of friction, flexibility, and excellent durability.

When the outer surface 27 of each belt is brought into contact with the surface of the band sheet 26 that is passed between the upper structure and the lower structure, the coefficient of friction of the surface is large, so that each belt moves while contacting the band sheet 26. As a result, the upper belt 10 and the lower belt 11 are circulated in a state where they are stretched on the respective reversing portions. In FIG. 2A, a direction in which each belt is circulated is indicated by an arrow R.

The inner surface 28 of each belt is brought into contact with the outer peripheral surfaces of each reversing portion and each pressing portion while being circulated. At this time, as described above, the upper pressing portion 15 and the lower pressing portion 21 are brought into contact with the inner surface 28 of the belt, and press the inner surface 28 of each belt in the direction in which the distance between the upper and lower pressing portions is reduced by the hydraulic cylinder, that is, the direction in which the band sheet 26 is clamped.

When the inner surfaces 28 of the upper belt 10 and the lower belt 11 are brought into contact with the upper pressing portion 15 and the lower pressing portion 21, slippage occurs and a frictional force is generated due to a small coefficient of friction of the inner surface 28. This frictional force acts in a direction (a direction opposite the arrow Z) opposite the direction in which the band sheet 26 is passed between the upper structure and the lower structure, and a coiling tension depending on the plate thickness and material of the band sheet may be obtained by adjusting the pressing force of the hydraulic cylinder. Further, the coiling tension is a frictional force generated in the belt and the pressing portion, and frictional heat is generated. This frictional heat is absorbed into the belt, and the temperature of the inner surface 28 of the belt increases.

In addition, the outer peripheral surfaces of the respective reversing portions, that is, in the arc-shaped outer peripheral surface 18, the arc-shaped outer peripheral surface 19, the arc-shaped outer peripheral surface 24, and the arc-shaped outer peripheral surface 25 are brought into contact with the inner surface 28 of each belt. Here, each reversing portion does not rotate in the direction of the circulation motion of each belt but remains fixed.

As shown in FIG. 2A, in the first reversing portion 14, the second reversing portion 16, the third reversing portion 20, and the fourth reversing portion 22, the inside of an outer layer portion of each reversing portion is formed as a cavity, and cooling water 29 flows in the cavity. The inner surfaces 28 of the heated upper belt 10 and lower belt 11 are brought into contact with the outer layer portion of each reversing portion, so that the heat is transferred from the outer layer portion to the cooling water 29 inside the respective reversing portions to cool the upper belt 10 and the lower belt 11.

A piping structure which is not shown is connected to side surfaces of the upper structure 2 and the lower structure 3 so that the cooling water 29 flows in a direction substantially orthogonal to the direction in which the band sheet 26 is passed between the upper structure 2 and the lower structure 3.

In addition, the band sheet 26 is passed from a side of a structure in which the first reversing portion 14 and the upper pressing portion 15 are integrated with each other. For this reason, the band sheet 26 is passed through a region where the upper belt 10 is supported by the first reversing portion 14 and the upper pressing portion 15, over a certain length from the left side in FIG. 2A to the gap 17 so that the straightness at the time of the circulation motion becomes good. Further, since the upper belt 10 is supported by the first reversing portion 14, the upper pressing portion 15, and the second reversing portion 16 except for the gap 17, it is possible to reduce damage to the inner surface 28 of the upper belt 10, which is caused by the circulation movement.

FIG. 2B shows side surfaces of the upper structure 2 and the lower structure 3 and their peripheral structures. The upper structure 2 and the lower structure 3 have a mechanism for adjusting the degree of tension of each belt.

As shown in FIG. 2B, a tension adjusting mechanism 32 capable of adjusting the degree of tension of the upper belt 10 is installed on side surface 30 of the first reversing portion and the upper pressing portion and a side surface 31 of the second reversing portion. The tension adjusting mechanism 32 can change the position of the second reversing portion 16, and change the size (a distance between the upper pressing portion 15 and the second reversing portion 16) of the gap 17 to adjust the degree of tension of the upper belt 10.

The tension adjusting mechanism 32 includes a pressing portion support 33, a reversing portion support 34, a reversing portion receiver 35, a position adjusting rod 36, and a position adjusting screw 37.

The pressing portion support 33 is mounted on the side surface 30, and the reversing portion support 34 is mounted on the side surface 31. One end of the position adjusting rod 36 is fixed to the reversing portion support 34. The other end of the position adjusting rod 36 extends in a direction substantially parallel to the direction in which the band sheet 26 is passed.

In addition, the reversing portion receiver 35 composed of two components is disposed in a direction substantially parallel to the position adjusting rod 36, and one end of the reversing portion receiver 35 is fixed to the pressing portion support 33. The reversing portion support 34 is disposed in a region in which it is fitted to the reversing portion receiver 35. The reversing portion receiver 35 serves as a guide for the movement of the reversing portion support 34 in the left and right direction as viewed in FIG. 2B.

A spiral groove is formed on an outer peripheral surface of the position adjusting rod 36. A through-hole into which the position adjusting rod 36 can be inserted is formed on the other end side 38 of the reversing portion receiver 35. Further, the position adjusting screw 37 that can be fitted to the spiral groove of the position adjusting rod 36 is mounted on the other end side 38 of the reversing portion receiver 35.

By rotating the position adjusting screw 37, the position of the reversing portion support 34 is changed along the position adjusting rod 36, and the position of the second reversing portion 16 can be changed in the left and right direction. As the second reversing portion 16 moves, the degree of tension of the upper belt 10 stretched on the second reversing portion 16 is adjusted so that the upper belt 10 is stretched or relaxed.

In addition, the lower structure 3 is also provided with the same structure as that of the tension adjusting mechanism 32. As a result, the degree of tension of the lower belt 11 can be adjusted.

As described above, in the first embodiment of the present invention, the heated belt is brought into contact with the respective reversing portions provided on the upper structure 2 and the lower structure 3 to efficiently remove heat.

Further, since the belt is stably supported by each reversing portion and each pressing portion, it is possible to enhance the straightness of the belt when the belt is circulated. In addition, since a gap between the reversing portion and the pressing portion is small, damage to the inner surface of the belt can be reduced and durability of the belt can be improved.

In addition, since the degree of tension of each belt can be adjusted by changing the positions of the second reversing portion and the fourth reversing portion, it is possible to prevent the belt from being rotated badly. Further, it is possible to easily exchange the positions of the belts with each other and to easily remove the belts during the maintenance work. Furthermore, by adjusting the degree of tension of the belt, an influence on the slippage between the inner surface of the belt and the pressing portion is small, and a suitable coiling tension is easily imparted.

In addition, since the degree of tension of each belt can be adjusted by changing the positions of the second reversing portion and the fourth reversing portion, even when the belt is rotated at a high speed so that an inertial force in a direction of flow of a metal band sheet acts on the belt, it is possible to maintain the adhesion of the belt at the second reversing portion and the fourth reversing portion which are the reversing portions on a side (advancing side) on which the band sheet is passed. As a result, the straightness of the circulation motion of the belt is ensured and the belt is not easily shaken, so that the contact between the adjacent band sheets can be suppressed. In addition, the cooling efficiency of the belt by a cooling structure that allows the cooling water to flow inside each reversing portion and each pressing portion can be increased, and the durability of the belt can be improved.

Second Embodiment

Hereinafter, a second embodiment of the present invention will be described.

FIGS. 3A and 3B are a schematic cross-sectional view and a schematic side view showing an upper structure and a lower structure according to the second embodiment of the present invention.

In FIG. 3A, a coiling tension applying device 39 according to the second embodiment of the present invention is described. The coiling tension applying device 39 includes an upper structure 40 disposed above the band sheet 26 and a lower structure 41 disposed below the band sheet 26. Further, in FIGS. 3A and 3B, the same components as those of the above-described first embodiment of the present invention are denoted by the same reference numerals and description thereof will be omitted. Hereinafter, components of the second embodiment different from the components of the first embodiment will be described.

The upper structure 40 has a first reversing portion 42, an upper pressing portion 43, and the second reversing portion 16. The difference between the first embodiment and the second embodiment is that the first reversing portion 42 and the upper pressing portion 43 are separated from each other and a gap 44 is formed between both the first reversing portion 42 and the upper pressing portion 43. In addition, a gap 17 is formed between the upper pressing portion 43 and the second reversing portion 16.

The upper belt 10 is stretched in an elliptical cross section thereof by the first reversing portion 42 and the second reversing portion 16. The upper belt 10 can be circulated on outer peripheral surfaces of the first reversing portion 42, the upper pressing portion 43, and the second reversing portion 16.

The first reversing portion 42 has an arc-shaped outer peripheral surface 45 and contacts the inner side of the upper belt 10 at the same portion. The first reversing portion 42 and the second reversing portion 16 do not contribute to the driving of the circulation motion of the upper belt 10, and the upper belt 10 is circulated by the contact with a band sheet.

The lower structure 41 has a third reversing portion 46, a lower pressing portion 47, and the fourth reversing portion 22. As in the first reversing portion 42, the third reversing portion 46 and the lower pressing portion 47 are separated from each other, and a gap 48 is formed between the third reversing portion 46 and the lower pressing portion 47. Further, a gap 23 formed between the lower pressing portion 47 and the fourth reversing portion 22.

As in the upper belt 10, the lower belt 11 is stretched in an elliptical cross section thereof by the third reversing portion 46 and the fourth reversing portion 22. The lower belt 11 can be circulated on outer peripheral surfaces of the third reversing portion 46, the lower pressing portion 47, and the fourth reversing portion 22.

The third reversing portion 46 has an arc-shaped outer peripheral surface 49 and contacts the inner side of the lower belt 11 at the same portion. The third reversing portion 46 and the fourth reversing portion 22 do not contribute to the driving of the circulation motion of the lower belt 11, and the lower belt 11 is also circulated by the contact with a band sheet.

The upper belt 10 and the lower belt 11 interlock with the upper pressing portion 43 and the lower pressing portion 47 to impart a coiling tension to the band sheet 26. The structure for generating the coiling tension on each belt is the same as that of the first embodiment described above.

As shown in FIG. 3A, in the first reversing portion 42, the second reversing portion 16, the third reversing portion 46, and the fourth reversing portion 22, the inside of an outer layer portion of each reversing portion is formed as a cavity, and the cooling water 29 flows in the cavity. The inner surfaces 28 of the heated upper belt 10 and lower belt 11 are brought into contact with the outer layer portion of each reversing portion, so that the heat is transferred from the outer layer portion to the cooling water 29 inside the respective reversing portions to cool the upper belt 10 and the lower belt 11.

A piping structure which is not shown is connected to side surfaces of the upper structure 40 and the lower structure 41 so that the cooling water 29 flows in a direction substantially orthogonal to the direction in which the band sheet 26 is passed between the upper structure 40 and the lower structure 41.

FIG. 3B shows side surfaces of the upper structure 40 and the lower structure 41 and their peripheral structures. The upper structure 40 and the lower structure 41 have a mechanism for adjusting the degree of tension of each belt.

As shown in FIG. 3B, a tension adjusting mechanism 53 capable of adjusting the degree of tension of the upper belt 10 is installed on a side surface 50 of the first reversing portion, a side surface 51 of the upper pressing portion, and the side surface 31 of the second reversing portion. The tension adjusting mechanism 53 can change the positions of the first reversing portion 42 and the second reversing portion 16, and change the size (a distance between the first reversing portion 42 and the upper pressing portion 43) of the gap 44 and the size (a distance between the upper pressing portion 43 and the second reversing portion 16) of the gap 17 to adjust the degree of tension of the upper belt 10. In addition, among structures of the tension adjusting mechanism 53, a structure between the upper pressing portion 43 and the second pressing portion 16 is the same as that of the tension adjusting mechanism 32 of the first embodiment.

A difference in the tension adjusting mechanism 53 according to the second embodiment from the first embodiment is that there is a tension adjusting mechanism even between the separated first reversing portion 42 and upper pressing portion 43.

The tension adjusting mechanism 53 has a pressing portion support 54 (a component corresponding to the pressing portion support 33), a reversing portion support 55, a reversing portion receiver 56, a position adjusting rod 57, and a position adjusting screw 58. These components have the same functions as the reversing portion support 34, the reversing portion receiver 35, the position adjusting rod 36, and the position adjusting screw 37, and are mounted symmetrically to each other as shown in FIG. 3B.

That is, by rotating the position adjusting screw 58, the position of the reversing portion support 55 mounted on the side surface 50 of the first reversing portion 42 is changed along the position adjusting rod 57, and the position of the first reversing portion 42 can be changed in the left and right direction. In the tension adjusting mechanism 53, not only the second reversing portion 16 but also the first reversing portion 42 is moved so that the degree of tension of the upper belt 10 stretched on the tension adjusting mechanism 53 can be adjusted.

In addition, the lower structure 41 is also provided with the same structure as the tension adjusting mechanism 53. As a result, the degree of tension of the lower belt 11 can be adjusted.

In the second embodiment, the positions of two reversing portions are changeable in the upper structure 40 and the lower structure 41, so that the degree of tension of each belt can be adjusted more widely. In other words, it is possible to adjust the degree of tension of each belt in a direction in which each belt is further tensed than in the first embodiment.

In addition, in the second embodiment, each pressing portion is structured to be separated from each reversing portion. Therefore, the size of the entire device may be changed by the size of each pressing portion without changing the design of the entire device.

For example, a width of the pressing portion indicated by W in FIG. 3B can be changed so that the widths of the respective pressing portions are different from each other. By reducing the width W of the pressing portion without changing the length in the longitudinal direction thereof, an area A of the pressing portion may be reduced and a surface pressure Pa may be reduced without changing a cylinder pressure P.

The surface pressure Pa is set within a certain range in consideration of appropriate coiling tension applied to the band sheet and occurrence of crimp marks on the band sheet surface. However, even in this case, as a value of the surface pressure becomes smaller, the damage to the belt becomes smaller and the durability is improved, so that the crimp marks are not easily generated on the band sheet. In the second embodiment, the width W of each pressing portion can be changed and the surface pressure can be reduced while the cylinder pressure is kept constant, so that the surface pressure can be easily adjusted. As a result, it is possible to widen the object of a plate thickness of the band sheet which can be handled by the slit band sheet coiling tension applying device.

In addition, the degree of tension of each belt can be adjusted by changing the position of each reversing portion. Therefore, even when the belt is rotated at a high speed so that an inertial force in a direction of flow of the metal band sheet acts on the belt, it is possible to maintain the adhesion of the belt in the second reversing portion and the fourth reversing portion which are the reversing portions on a side (advancing side) at which the band sheet is passed between the upper structure and the lower structure. As a result, the straightness of the circulation motion of the belt is ensured and the belt is not easily shaken, so that the contact between the adjacent band sheets can be suppressed. Further, the cooling efficiency of the belt by a cooling structure that allows the cooling water to flow inside each reversing portion and each pressing portion can be increased, and the durability of the belt can be improved.

Third Embodiment

Hereinafter, a third embodiment of the present invention will be described.

FIGS. 4A and 4B are a schematic cross-sectional view and a schematic side view showing an upper structure and a lower structure according to a third embodiment of the present invention.

In FIGS. 4A and 4B, a coiling tension applying device 59 according to the third embodiment of the present invention is described. The coiling tension applying device 59 includes an upper structure 60 disposed above the band sheet 26 and a lower structure 61 disposed below the band sheet 26.

The structure of the third embodiment is the same as that of the first embodiment described above, and a difference between the structure of the third embodiment and the structure of the first embodiment is in an internal cooling structure. For the same components as those of the first embodiment, description of the components and description of reference numerals thereof will be omitted.

The coiling tension applying device 59 according to the third embodiment of the present invention has a structure in which a first reversing portion 62 and an upper pressing portion 63 constituting the upper structure 60 are integrated with each other. A second reversing portion 64 has a double cylindrical structure composed of an inner cylinder portion 65 having a solid inside and an outer cylinder portion 66 formed outside the inner cylinder portion 65. In addition, a space between the inner cylinder portion 65 and the outer cylinder portion 66 is formed, and cooling water 67 flows in this space. The outer cylinder portion 66 is made of steel having a thickness of 1 to 3 mm so as to efficiently transfer the heat of the belt to the cooling water. Similarly, the lower structure 61 also has a double cylindrical structure therein, and the cooling water 67 flows into the space between the inner cylinder portion 65 and the outer cylinder portion 66.

Here, the outer cylinder portion 66 is not necessarily required to be made of steel having a plate thickness of 1 to 3 mm. However, it is preferable that the outer cylinder portion 66 be made of steel having a plate thickness of 1 to 3 mm in that the movement of heat from the surfaces of each reversing portion and each pressing portion to the cooling water therein becomes faster by further reducing the plate thickness of the outer layer portion and constant durability can be ensured. Further, the material of the outer cylinder portion 66 is not limited to steel, but it is sufficient that the outer cylinder portion 66 has durability and excellent heat transfer efficiency. Here, a metal or the like satisfying the conditions can be employed.

As in the first embodiment, in the third embodiment, a tension adjusting mechanism 32 is installed as a mechanism for adjusting the degree of tension of each belt. As a result, the positions of the second reversing portion 64 and the fourth reversing portion 68 can be changed (see FIG. 4B).

In the above-described third embodiment, by adopting a double cylindrical structure as the internal structure of each reversing portion and each pressing portion, the cooling water 67 flows near the outer peripheral surface of the outer cylinder portion 66 where each belt contacts, so that the cooling efficiency is further increased. In addition, since the space in which the cooling water 67 flows is small, efficient heat removal can be realized while reducing an amount of the cooling water.

In addition, since the plate thickness of the outer cylinder portion 66 is 1 to 3 mm, the heat from the inner surface of each belt is easy to move, and the outer cylinder portion 66 has a high thermal conductivity to the cooling water 67 therein.

Fourth Embodiment

Hereinafter, a fourth embodiment of the present invention will be described.

FIGS. 5A and 5B are a schematic cross-sectional view and a schematic side view showing an upper structure and a lower structure according to the fourth embodiment of the present invention.

In FIGS. 5A and 5B, a coiling tension applying device 69 according to the fourth embodiment of the present invention is described. The coiling tension applying device 69 includes an upper structure 70 disposed above the band sheet 26 and a lower structure 71 disposed below the band sheet 26.

The structure of the fourth embodiment is the same as that of the second embodiment described above, and a difference between the structure of the fourth embodiment and the structure of the second embodiment is in an internal cooling structure. For the same components as those of the second embodiment, description of the components and description of reference numerals thereof will be omitted.

Each of a first reversing portion 72, an upper pressing portion 73, and a second reversing portion 74 constituting the upper structure 70 has a double cylindrical structure composed of an inner cylinder portion 75 having a solid inside and an outer cylinder portion 76 formed outside the inner cylinder portion 75. In addition, a space between the inner cylinder portion 75 and the outer cylinder portion 76 is formed, and cooling water 77 flows in this space. The outer cylinder portion 76 is made of steel having a thickness of 1 to 3 mm so as to efficiently transfer the heat of the belt to the cooling water. Similarly, the lower structure 71 also has a double cylindrical structure therein, and the cooling water 77 flows into the space between the inner cylinder portion 75 and the outer cylinder portion 76.

Here, the outer cylinder portion 76 is not necessarily required to be made of steel having a plate thickness of 1 to 3 mm. However, it is preferable that the outer cylinder portion 76 be made of steel having a plate thickness of 1 to 3 mm in that the movement of heat from the surfaces of each reversing portion and each pressing portion to the cooling water therein becomes faster by further reducing the plate thickness of the outer layer portion and constant durability can be ensured. Further, the material of the outer cylinder portion 76 is not limited to steel, but it is sufficient that the outer cylinder portion 76 has durability and excellent heat transfer efficiency. Here, a metal or the like satisfying the conditions can be employed.

As in the second embodiment, in the fourth embodiment, a tension adjusting mechanism 53 is installed as a mechanism for adjusting the degree of tension of each belt. As a result, the position of each reversing portion can be changed (see FIG. 5B).

In the above-described fourth embodiment, by adopting a double cylindrical structure as the internal structure of each reversing portion and each pressing portion, the cooling water 77 flows near the outer peripheral surface of the outer cylinder portion 76 where each belt contacts, so that the cooling efficiency is further increased. In addition, since the space in which the cooling water 77 flows is small, efficient heat removal can be realized while reducing an amount of the cooling water.

In addition, since the plate thickness of the outer cylinder portion 76 is 1 to 3 mm, the heat from the inner surface of each belt is easy to move, and the outer cylinder portion 76 has a high thermal conductivity to the cooling water 77 therein.

Fifth Embodiment

Hereinafter, a fifth embodiment of the present invention will be described.

FIGS. 6A and 6B are a schematic cross-sectional view and a schematic side view showing an upper structure and a lower structure according to the fifth embodiment of the present invention.

In FIG. 6A, a coiling tension applying device 78 according to the fifth embodiment of the present invention is described. The coiling tension applying device 78 includes an upper structure 79 disposed above the band sheet 26 and a lower structure 80 disposed below the band sheet 26.

The structure of the fifth embodiment is the same as that of the first embodiment described above, and a difference between the structure of the fifth embodiment and the structure of the first embodiment is that the each of a second reversing portion and a fourth reversing portion has a small size. For the same components as those of the first embodiment, description of the components and description of reference numerals thereof will be omitted.

The upper structure 79 includes an integrated structure of the first reversing portion 14 and the upper pressing portion 15 and a second reversing portion 81 formed to be smaller than the first reversing portion 14. More specifically, the first reversing portion 14 has a substantially semicircular shape in cross section, but the cross section of the second reversing portion 81 has a substantially comb shape smaller than the cross section of the first reversing portion 14. Therefore, an outer circumferential diameter of the entire upper structure 79 is smaller than an outer circumferential diameter of the upper structure 2 of the above-described first embodiment.

In addition, in the upper structure 79, the upper belt 10 is stretched by the first reversing portion 14 and the second reversing portion 81. As in the upper structure 2, the upper structure 79 has an elliptical cross section. Further, a gap 82 is formed between the upper pressing portion 15 and the second reversing portion 81.

As in the upper structure 79, in the lower structure 80, the cross section of a fourth reversing portion 83 has a substantially comb shape smaller than the cross section of the third reversing portion 20.

As in the first embodiment, in the fifth embodiment, the tension adjusting mechanism 32 is installed as a mechanism for adjusting the degree of tension of each belt. As a result, the positions of the second reversing portion 81 and the fourth reversing portion 83 can be changed (see FIG. 6B).

In the fifth embodiment, since the shapes of the second reversing portion 81 and the fourth reversing portion 83 are formed to be smaller than those of the first reversing portion 14 and the third reversing portion 20, it is possible to make the overall shapes of the upper structure 79 and the lower structure 80 compact, that is, to contribute to downsizing of the coiling tension applying device. In addition, since the second reversing portion 81 and the fourth reversing portion 83 are made smaller, a moving distance of each of the second reversing portion 81 and the fourth reversing portion 83 when the degree of tension of the belt is adjusted can be made long, as compared to, for example, the structure of the first embodiment. As a result, a range in which the degree of tension of the belt can be adjusted can be made wider.

Sixth Embodiment

Hereinafter, a sixth embodiment of the present invention will be described.

FIGS. 7A and 7B are a schematic cross-sectional view and a schematic side view showing an upper structure and a lower structure according to the sixth embodiment of the present invention.

In FIG. 7A, a coiling tension applying device 84 according to the sixth embodiment of the present invention is described. The coiling tension applying device 84 includes an upper structure 85 disposed above the band sheet 26 and a lower structure 86 disposed below the band sheet 26.

The structure of the sixth embodiment is the same as that of the second embodiment described above, and a difference between the structure of the sixth embodiment and the structure of the second embodiment is that each reversing portion has a small size. For the same components as those of the second embodiment, description of the components and description of reference numerals thereof will be omitted.

The upper structure 85 includes a first reversing portion 87, the upper pressing portion 43, and a second reversing portion 88, and has a structure where they are separated from each other. In addition, the cross section of each of the first reversing portion 87 and the second reversing portion 88 has a substantially comb shape whose circumference is less than a semicircle. Further, the cross section of each of the first reversing portion 87 and the second reversing portion 88 is shorter than the length of the upper pressing portion 43 in the vertical length viewed in FIG. 6A, as compared to the cross section of the upper pressing portion 43.

In addition, in the upper structure 85, the upper belt 10 is stretched by the first reversing portion 87 and the second reversing portion 88. As in the upper structure 40, the upper structure 85 has an elliptical cross section. Further, a gap 82 is formed between the first reversing portion 87 and the upper pressing portion 43 and between the upper pressing portion 43 and the second reversing portion 88.

As in the upper structure 85, in the lower structure 86, the cross section of each of a third reversing portion 90 and a fourth reversing portion 91 has a substantially comb shape whose circumference is less than a semicircle.

As in the second embodiment, in the sixth embodiment, the tension adjusting mechanism 53 is installed as a mechanism for adjusting the degree of tension of each belt. As a result, the position of each reversing portion can be changed (see FIG. 7B).

In the sixth embodiment, since the cross section of each reversing portion has a substantially comb shape whose circumference is less than a semicircle, it is possible to make the overall shapes of the upper structure 85 and the lower structure 86 compact, as compared to the second embodiment. In addition, even as compared to the above-described fifth embodiment, it is possible to make the overall shapes thereof further compact, that is, to further contribute to downsizing of the coiling tension applying device. In addition, since each reversing portion is made smaller, a moving distance of each reversing portion when the degree of tension of the belt is adjusted can be made long, as compared to, for example, the structure of the second embodiment or the structure of the fifth embodiment. As a result, a range in which the degree of tension of the belt can be adjusted can be made wider.

Seventh Embodiment and Eighth Embodiment

Hereinafter, a seventh embodiment and an eighth embodiment of the present invention will be described.

FIG. 8A is a schematic cross-sectional view showing an upper structure and a lower structure according to a seventh embodiment of the present invention, and FIG. 8B is a schematic cross-sectional view showing an upper structure and a lower structure according to an eighth embodiment of the present invention.

In FIG. 8A, a coiling tension applying device 92 according to the seventh embodiment of the present invention is described. The coiling tension applying device 92 includes an upper structure 93 disposed above the band sheet 26 and a lower structure 94 disposed below the band sheet 26.

The structure of the seventh embodiment is the same as that of the fifth embodiment described above, and a difference between the structure of the seventh embodiment and the structure of the fifth embodiment is in an internal cooling structure. For the same components as those of the fifth embodiment, description of the components and description of reference numerals thereof will be omitted.

The coiling tension applying device 92 according to the seventh embodiment has an integrated structure of a first reversing portion 95 and an upper pressing portion 96 constituting the upper structure 93. A second reversing portion 97 has a double cylindrical structure composed of an inner cylinder portion 98 has a solid inside and an outer cylinder portion 99 formed outside the inner cylinder portion 98. In addition, a space is formed between the inner cylinder portion 98 and the outer cylinder portion 99, and cooling water 100 flows in this space. Similarly, the lower structure 94 has a double cylindrical structure therein, and the cooling water 100 flows in the space between the inner cylinder portion 98 and the outer cylinder portion 99.

Although not shown in the seventh embodiment, as in the fifth embodiment, the tension adjusting mechanism 32 is installed as a mechanism for adjusting the degree of tension of each belt. As a result, the positions of the second reversing portion 97 and a fourth reversing portion 101 can be changed.

In FIG. 8B, a coiling tension applying device 102 according to the eighth embodiment of the present invention is described. The coiling tension applying device 102 includes an upper structure 103 disposed above the band sheet 26 and a lower structure 104 disposed below the band sheet 26.

The structure of the eighth embodiment is the same as that of the sixth embodiment described above, and a difference between the structure of the eighth embodiment and the structure of the sixth embodiment is in an internal cooling structure. For the same components as those of the sixth embodiment, description of the components and description of reference numerals thereof will be omitted.

Each of a first reversing portion 105, an upper pressing portion 106, and a second reversing portion 107 constituting the upper structure 103 has a double cylindrical structure composed of an inner cylinder portion 108 having a solid inside and an outer cylinder portion 109 formed outside the inner cylinder portion 108. In addition, a space is formed between the inner cylinder portion 108 and the outer cylinder portion 109, and cooling water 110 flows in this space. Similarly, the lower structure 104 has a double cylindrical structure therein, and the cooling water 110 flows in the space between the inner cylinder portion 108 and the outer cylinder portion 109.

Although not shown in the eighth embodiment, as in the sixth embodiment, the tension adjusting mechanism 53 is installed as a mechanism for adjusting the degree of tension of each belt. As a result, the position of each reversing portion can be changed.

In the above-described seventh embodiment and the eighth embodiment, by adopting a double cylindrical structure as the internal structure of each reversing portion and each pressing portion, the cooling water flows near the outer peripheral surface of the outer cylinder portion where each belt contacts, so that the cooling efficiency is further increased. In addition, since the space in which the cooling water flows is small, efficient heat removal can be realized while reducing an amount of the cooling water.

Ninth Embodiment

Hereinafter, a ninth embodiment of the present invention will be described.

Figure 9:
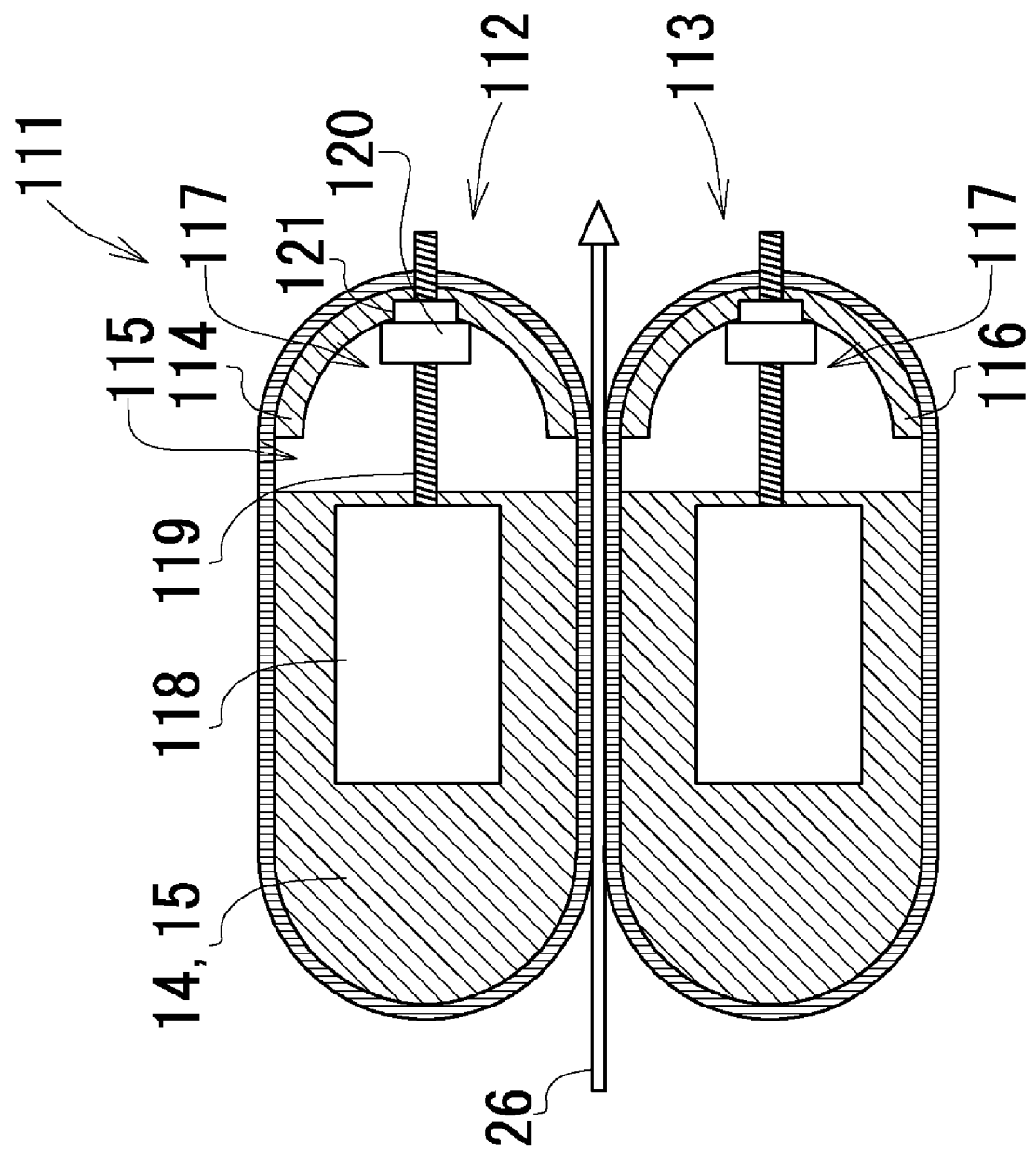
FIG. 9 is a schematic cross-sectional view showing an upper structure and a lower structure according to a ninth embodiment of the present invention.

FIG. 9 is a schematic cross-sectional view showing an upper structure and a lower structure according to the ninth embodiment of the present invention.

In FIG. 9, a coiling tension applying device 111 according to the ninth embodiment of the present invention is described. The coiling tension applying device 111 includes an upper structure 112 disposed above the band sheet 26 and a lower structure 113 disposed below the band sheet 26.

The structure of the ninth embodiment is the same as that of each of the first embodiment and the fifth embodiment described above, and a difference between the structure of the ninth embodiment and the structures of the first and fifth embodiments is that each of the second reversing portion and the fourth reversing portion has an arc-shaped outer appearance and does not have a cooling structure therein. For the same components as those of the first and fifth embodiments, description of the components and description of reference numerals thereof will be omitted.

The upper structure 112 includes an integrated structure of the first reversing portion 14 and the upper pressing portion 15 and a second reversing portion 114 having an arc-shaped outer appearance. As in the upper structure 2 (the upper structure 78), the upper belt 10 is stretched by the first reversing portion 14 and the second reversing portion 114, and has an elliptical cross section. In addition, a gap 115 is formed between the upper pressing portion 15 and the second reversing portion 114.

Although not shown, the inside of the integrated structure of the first reversing portion 14 and the upper pressing portion 15 is formed in a cylindrical shape. As in the first embodiment and the fifth embodiment, the inside of the integrated structure of the first reversing portion 14 and the upper pressing portion 15 has a cooling structure that allows the cooling water 29 to flow therein. In addition, the second reversing portion 114 is a member that has an arc-shaped outer appearance and a solid inside, and does not have a cooling structure therein.

As in the upper structure 112, in the lower structure 113, a fourth reversing portion 116 is a member that has an arc-shaped outer appearance and a solid inside, and does not have a cooling structure therein.

In addition, in the ninth embodiment, the positions of the second reversing portion 114 and the fourth reversing portion 116 are changed, and a tension adjusting mechanism 117 that can adjust the degree of tension of each belt is installed.

The tension adjusting mechanism 117 includes a pressing portion support 118, a position adjusting rod 119, a reversing portion receiver 120, and a position adjusting screw 121. The position adjusting rod 120 fixed to the pressing portion support 118 at an end thereof extends to a side of the second reversing portion 114 or the fourth reversing portion 116, and is inserted through the reversing portion receiver 120 fixed to each reversing portion. The position adjusting rod 121 mounted on the reversing portion receiver 120 is screwed into the position adjusting rod 120 and the position adjusting screw 121 is rotated, by which the position of each reversing portion can be changed.

The coiling tension applying device 111 according to the ninth embodiment is used when a sufficient cooling effect is obtained for each belt by only the cooling structure inside the integrated structure of the first reversing portion 14 and the upper pressing portion 15. Since the second reversing portion 114 and the fourth reversing portion 116 do not have a cooling structure therein, the structure of the device can be simplified.

Here, the first reversing portion 14 and the upper pressing portion 15 need not have the same internal cooling structure as that of each of the first and fifth embodiments. For example, a structure that allows the cooling water to flow between the inner cylinder portion and the outer cylinder portion in such a manner that the inside of the first reversing portion 14 and the upper pressing portion 15 is formed as a double pipe structure may be adopted.

Tenth Embodiment

Hereinafter, a tenth embodiment of the present invention will be described.

Figure 10:
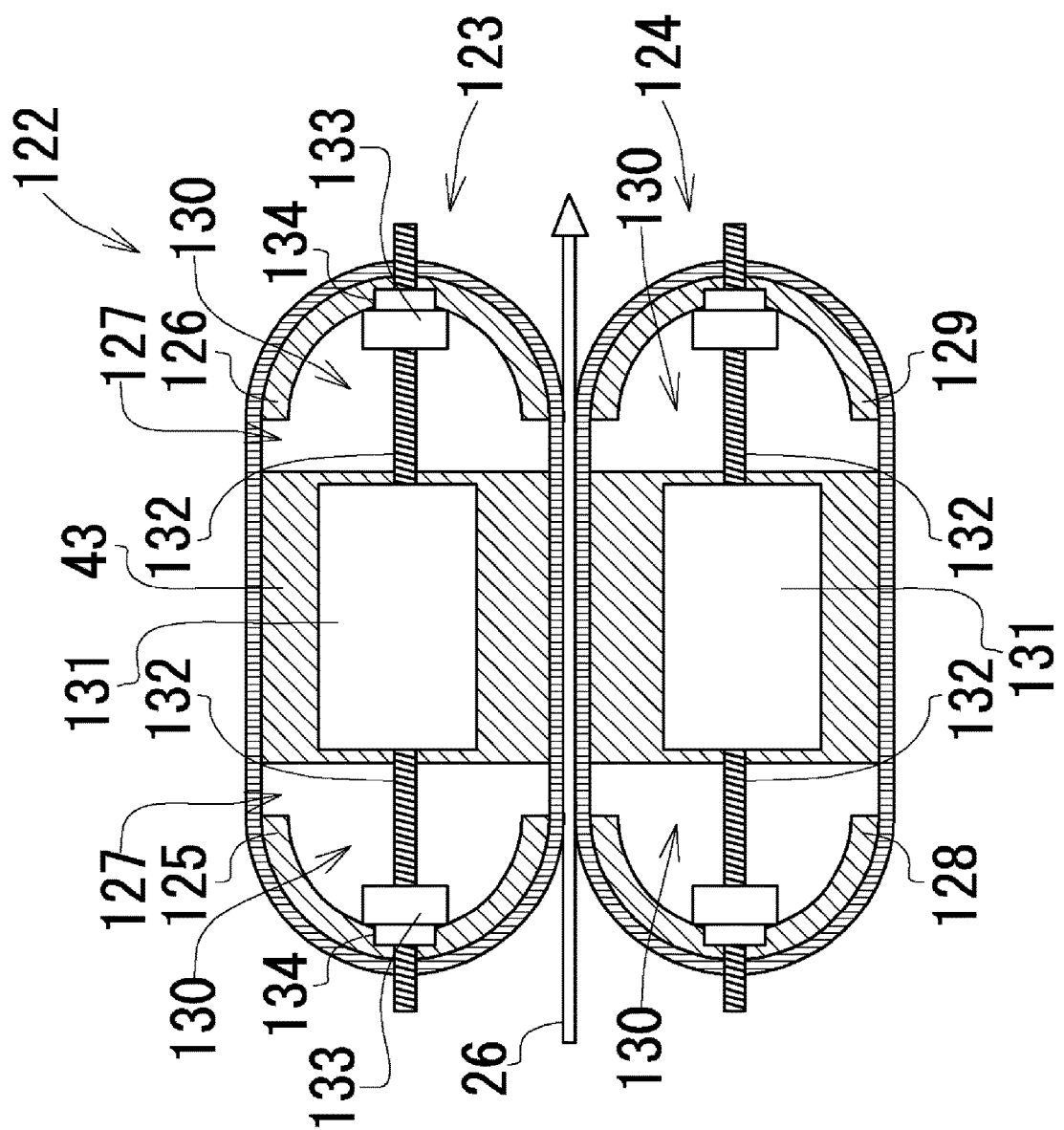
FIG. 10 is a schematic cross-sectional view showing an upper structure and a lower structure according to a tenth embodiment of the present invention.
Figure 11:
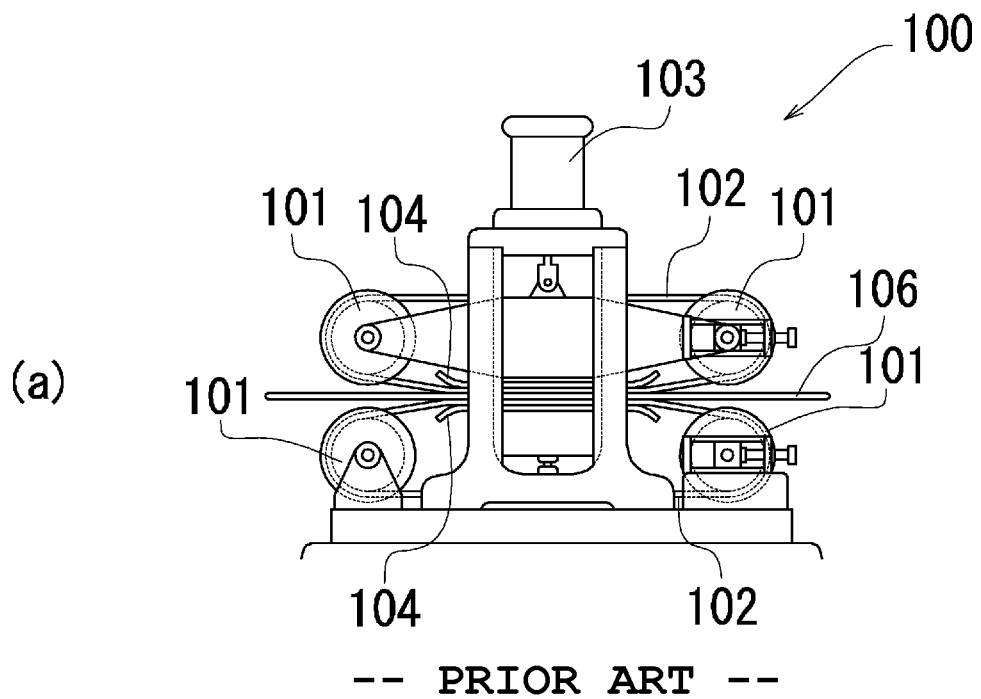
FIG. 11A is a schematic view showing a conventional coiling tension applying device using a pulley.
FIG. 11B is a schematic view showing a coiling tension applying device using an elliptical pressure applying body.
Figure 11:
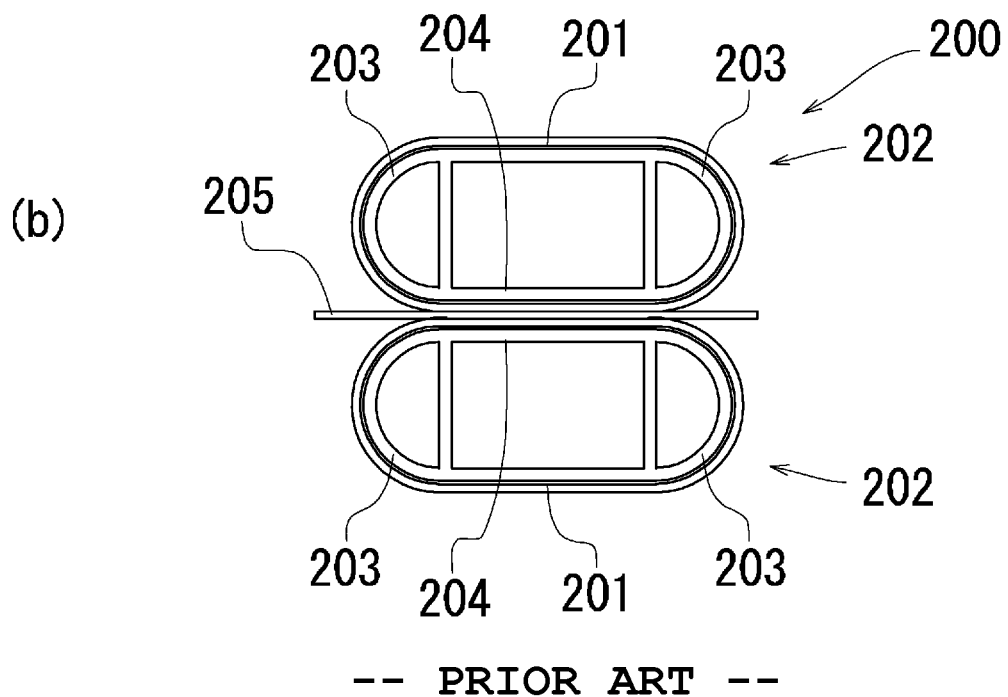

FIG. 10 is a schematic cross-sectional view showing an upper structure and a lower structure according to the tenth embodiment of the present invention.

In FIG. 10, a coiling tension applying device 122 according to the tenth embodiment of the present invention is described. The coiling tension applying device 122 includes an upper structure 123 disposed above the band sheet 26 and a lower structure 124 disposed below the band sheet 26.

The structure of the tenth embodiment is the same as that of each of the second embodiment and the sixth embodiment described above, and a difference between the structure of the tenth embodiment and the structures of the second and sixth embodiments is that each reversing portion has an arc-shaped outer appearance and does not have a cooling structure therein. For the same components as those of the second and sixth embodiments, description of the components and description of reference numerals thereof will be omitted.

The upper structure 123 includes a first reversing portion 125, an upper pressing portion 43, and a second reversing portion 126, and has a structure in which they are separated from each other. Each of the first reversing portion 125 and the second reversing portion 126 has an arc-shaped outer appearance, and the upper belt 10 is stretched thereon. In addition, a gap 127 is formed between the first reversing portion 125 and the upper pressing portion 43 and between the upper pressing portion 43 and the second reversing portion 126.

Although not shown, the inside of the upper pressing portion 43 is formed in a cylindrical shape. As in the second embodiment and the sixth embodiment, the upper pressing portion 43 has a cooling structure that allows the cooling water 29 to flow therein. In addition, each of the first reversing portion 125 and the second reversing portion 126 is a member that has an arc-shaped outer appearance and a solid inside, and does not have a cooling structure therein.

As in the upper structure 123, in the lower structure 124, each of a third reversing portion 128 and a fourth reversing portion 129 is a member that has an arc-shaped outer appearance and a solid inside and does not have a cooling structure therein.

In addition, in the tenth embodiment, the position of each reversing portion is changed and a tension adjusting mechanism 130 that can adjust the degree of tension of each belt is installed.

The tension adjusting mechanism 130 includes a pressing portion support 131, a position adjusting rod 132, a reversing portion receiver 133, and a position adjusting screw 134. The position adjusting rod 132 fixed to the pressing portion support 131 at an end thereof extends to a side of the first reversing portion 125 (the third reversing portion 128) or the second reversing portion 126 (the fourth reversing portion 129), and is inserted through the reversing portion receiver 133 fixed to each reversing portion. The position adjusting screw 134 mounted on the reversing portion receiver 133 is screwed into the position adjusting rod 132 and the position adjusting screw 134 is rotated, by which the position of each reversing portion can be changed.

The coiling tension applying device 122 according to the tenth embodiment is used when a sufficient cooling effect is obtained for each belt by only the cooling structure inside the upper pressing portion 15 and the lower pressing portion 47. Since each reversing portion does not have a cooling structure therein, the structure of the device can be further simplified.

Here, the upper pressing portion 15 and the lower pressing portion 47 need not have the same internal cooling structure as that of each of the second and sixth embodiments. For example, a structure that allows the cooling water to flow between the inner cylinder portion and the outer cylinder portion in such a manner that the inside of the upper pressing portion 15 and the lower pressing portion 47 is formed as a double pipe structure may be adopted.

As described above, the slit band sheet coiling tension applying device according to the present invention is excellent in durability and improved in convenience in a slitter line of a metal band sheet.

DESCRIPTIONS OF REFERENCE NUMERALS

| | |
|---|---|
| 1: coiling tension applying device | 2: upper structure |
| 3: lower structure | 4: shaft body |
| 5: bearing | 6: shaft body |
| 7: bearing | 8: support portion |
| 9: stand portion | 10: upper belt |
| 11: lower belt | 12: elevating rod |
| 13: hydraulic cylinder | 14: first reversing portion |
| 15: upper pressing portion | 16: second reversing portion |
| 17: gap | 18: arc-shaped outer peripheral surface |
| 19: arc-shaped outer peripheral surface | 20: third reversing portion |
| 21: lower pressing portion | 22: fourth reversing portion |
| 23: gap | 24: arc-shaped outer peripheral surface |
| 25: arc-shaped outer peripheral surface | 26: band sheet |
| 27: outer surface | 28: inner surface |
| 29: cooling water | 30: side surface of upper pressing portion |
| 31: side surface of second reversing portion | |
| 32: tension adjusting mechanism | 33: pressing portion support |
| 34: reversing portion support | 35: reversing portion receiver |
| 36: position adjusting rod | 37: position adjusting screw |
| 38: the other end side of reversing portion receiver | |
| 39: coiling tension applying device | 40: pper structure |
| 41: lower structure | 42: first reversing portion |
| 43: upper pressing portion | 44: gap |
| 45: arc-shaped outer peripheral surface | 46: third reversing portion |
| 47: lower pressing portion | 48: gap |
| 49: arc-shaped outer peripheral surface | 50: side surface of first reversing portion |
| 51: side surface of upper pressing portion | 53: tension adjusting mechanism |
| 54: pressing portion support | 55: reversing portionsupport |
| 56: reversing portion receiver | 57: position adjusting rod |
| 58: position adjusting screw | 59: coiling tension applying device |
| 60: upper structure | 61: lower structure |
| 62: first reversing portion | 63: upper pressing portion |
| 64: second reversing portion | 65: inner cylinder portion |
| 66: outer cylinder portion | 67: cooling water |
| 68: fourth reversing portion | 69: coiling tension applying device |
| 70: upper structure | 71: lower structure |
| 72: first reversing portion | 73: upper pressing portion |
| 74: second reversing portion | 75: inner cylinder portion |
| 72a: third reversing portion | 74a: forth reversing portion |
| 76: outer cylinder portion | 77: cooling water |
| 78: coiling tension applying device | 79: upper structure |
| 80: lower structure | 81: second reversing portion |
| 82: gap | 83: fourth reversing portion |
| 84: coiling tension applying device | 85: upper structure |
| 86: lower structure | 87: first reversing portion |
| 88: second reversing portion | 89: gap |
| 90: third reversing portion | 91: fourth reversing portion |
| 92: coiling tension applying device | 93: upper structure |
| 94: lower structure | 95: first reversing portion |
| 96: upper pressing portion | 97: second reversing portion |
| 98: inner cylinder portion | 99: outer cylinder portion |
| 100: cooling water | 101: fourth reversing portion |
| 102: coiling tension applying device | 103: upper structure |
| 104: lower structure | 105: first reversing portion |
| 106: upper pressing portion | 107: second reversing portion |
| 108: inner cylinder portion | 109: outer cylinder portion |
| 110: cooling water | 111: coiling tension applying device |
| 112: upper structure | 113: lower structure |
| 114: second reversing portion | 115: gap |
| 116: fourth reversing portion | 117: tension adjusting mechanism |
| 118: pressing portion support | 119: position adjusting rod |
| 120: reversing portion receiver | 121: position adjusting screw |
| 122: coiling tension applying device | 123: upper structure |
| 124: lower structure | 125: first reversing portion |
| 126: second reversing portion | 127: gap |
| 128: third reversing portion | 129: fourth reversing portion |
| 130: tension adjusting mechanism | 131: pressing portion support |
| 132: position adjusting rod | 133: reversing portion receiver |
| 134: position adjusting screw | |

What is claimed is:

1. A device for applying coiling-tension to a slit band sheet comprising:

a first stretched portion having a first belt reversing portion, which has an arc-shaped outer peripheral surface formed on a side of the first stretched portion, and a second belt reversing portion, which has an arc-shaped outer peripheral surface formed on opposite side of the first stretched portion, and wherein there is a predetermined gap between the first belt reversing portion and the second belt reversing portion;

one or more first belts, each of the one or more first belts being made of materials having different coefficients of friction, wherein the one or more first belts have a side having a smaller coefficient of friction than that of the opposite side thereof, and the side of the one or more first belts having the with the arc-shaped outer peripheral surfaces of the first belt reversing portion and the second belt reversing portion, and wherein the one or more first belts are stretched in a ring shape to be freely rotated around the first stretched portion;

a first pressing portion being in distance with a predetermined gap from the first belt reversing portion and being in distance with a predetermined gap from the second belt reversing portion, and wherein the first pressing portion is in contact with the side of the one or more first belts having the smaller coefficient of friction in a predetermined length;

a first tension adjusting portion constructed to adjust a distance and a size of the predetermined gap between the first belt reversing portion and the first pressing portion, and adjust a distance and a size of the predetermined gap between the second belt reversing portion and the first pressing portion;

a second stretched portion having a third belt reversing portion positioned to face the first belt reversing portion-, which has an arc-shaped outer peripheral surface formed on a side of the second stretched portion, and a fourth belt reversing portion, which has an arc-shaped outer peripheral surface formed on opposite side of the second stretched portion, and wherein there is a predetermined gap between the third belt reversing portion and the fourth belt reversing portion, and wherein the fourth belt reversing portion is positioned to face the second belt reversing portion;

one or more second belts, each of the one or more second belts being made of materials having different coefficients of friction, wherein the one or more second belts have a side having a smaller coefficient of friction than that of the opposite side thereof, and the side of the one or more second belts having the smaller coefficient of friction are in contact with the arc-shaped outer peripheral surfaces of the third belt reversing portion and the fourth belt reversing portion, and wherein the one or more second belts are stretched in a ring shape to be freely rotated around the second stretched portion;

a second pressing portion being in distance with a predetermined gap from the third belt reversing portion and being in distance with a predetermined gap from the fourth belt reversing portion, and wherein the second pressing portion is in contact with the side of the one or more second belts having the smaller coefficient of friction in a predetermined length; and a second tension adjusting portion constructed to adjust a distance and a size of the predetermined gap between the third belt reversing portion and the second pressing portion, and adjust a distance and a size of the predetermine gap between the fourth belt reversing portion and the second pressing portion, wherein the first tension adjusting portion changes a degree of tension of the one or more first belts from adjustment of a distance and a size of the predetermined gap between the first belt reversing portion and the second belt reversing portion, wherein the second tension adjusting portion is configured to change a degree of tension of the one or more second belts from adjustment of a distance and a size of the predetermined gap between the third belt reversing portion and the fourth belt reversing portion, wherein surfaces of the first belt reversing portion and the second belt reversing portion that form the predetermined gaps in the first stretched portion, are substantially planar, and wherein surfaces of the third belt reversing portion and the fourth belt reversing portion that form the predetermined gaps in the second stretched portion, are substantially planar.

2. The device as claimed in claim 1, wherein an inside of each of the first belt reversing portion, the second belt reversing portion, the third belt reversing portion and the fourth belt reversing portion is constructed to have a means for being cooled.

3. The device as claimed in claim 2, wherein each of the first belt reversing portion, the second belt reversing portion, the third belt reversing portion and the fourth belt reversing portion comprises an inner cylinder portion and an outer cylinder portion substantially surrounding the inner cylinder portion, and is constructed to allow cooling water to be circulated between the inner cylinder portion and the outer cylinder portion.

4. The device as claimed in claim 1, wherein an inside of each of the first pressing portion and the second pressing portion is constructed to have a means for being cooled.

5. The device as claimed in claim 1, wherein the one or more first belts are disposed in the first stretched portion side by side with each other having same intervals between adjacent first belts, and the one or more second belts are disposed in the second stretched portion side by side with each other having same intervals between adjacent second belts.

\* \* \* \* \*